(12) United States Patent (10) Patent No.: US 8,941,661 B2
Asente (45) Date of Patent: Jan. 27, 2015

(54) AUTOMATIC CORNER GENERATION

(75) Inventor: Paul J. Asente, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1057 days.

(21) Appl. No.: 12/987,029

(22) Filed: Jan. 7, 2011

(65) Prior Publication Data

US 2014/0285492 A1  Sep. 25, 2014

Related U.S. Application Data

(63) Continuation-in-part of application No. 12/459,376, filed on Jun. 29, 2009, now Pat. No. 8,674,995.

(60) Provisional application No. 61/212,720, filed on Apr. 14, 2009.

(51) Int. Cl.
*G06F 17/00* (2006.01)
*G06T 1/00* (2006.01)
*G06T 15/00* (2011.01)
*G06T 17/00* (2006.01)
*G06T 11/20* (2006.01)

(52) U.S. Cl.
USPC ........... 345/442; 345/418; 345/419; 345/420; 345/441; 345/581

(58) Field of Classification Search
USPC .......................... 345/442, 418–420, 441, 581
See application file for complete search history.

(56) References Cited

U.S. PATENT DOCUMENTS

| | | | |
|---|---|---|---|
| 5,539,868 | A | 7/1996 | Hosoya et al. |
| 5,831,632 | A | 11/1998 | Schuster et al. |
| 6,035,242 | A | 3/2000 | Uemura et al. |
| 6,271,859 | B1 | 8/2001 | Asente |
| 6,310,622 | B1 | 10/2001 | Asente |
| 6,522,328 | B1 | 2/2003 | Asente |
| 6,879,872 | B2 | 4/2005 | Fukumura |
| 7,880,744 | B2 | 2/2011 | Bruderlin et al. |
| 2003/0052875 | A1 | 3/2003 | Salomie |
| 2010/0045671 | A1 | 2/2010 | Slabaugh et al. |

*Primary Examiner* — Ke Xiao
*Assistant Examiner* — Robert Craddock
(74) *Attorney, Agent, or Firm* — Kilpatrick Townsend & Stockton LLP

(57) ABSTRACT

A system is disclosed. The system includes a processor configured to: receive a path in an artwork, the path having at least one corner; receive a selection of a patterned tile to apply to the path; and automatically generate a patterned corner tile corresponding to the selected patterned tile at least in part by mapping a side patterned tile to a corner patterned tile; and a memory coupled to the processor and configured to provide the processor with instructions.

20 Claims, 38 Drawing Sheets

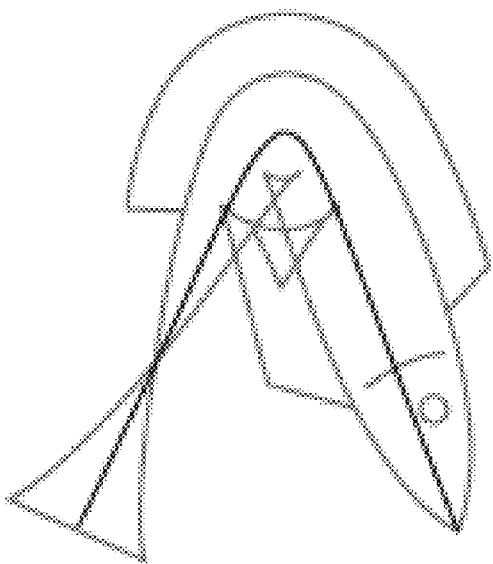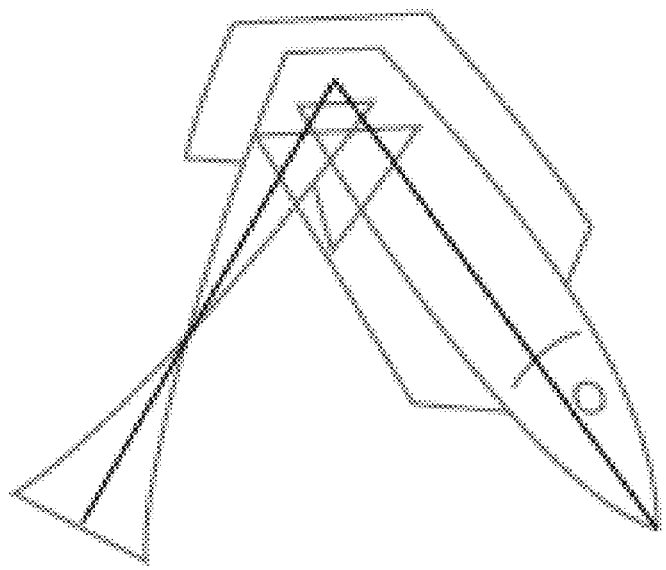
FIG. 10(a)   FIG. 10(b)
FIG. 10

AUTOMATIC CORNER GENERATION

CROSS REFERENCE TO OTHER APPLICATIONS

This application is a continuation in part of co-pending U.S. patent application Ser. No. 12/459,376 entitled FOLDING AVOIDANCE IN SKELETAL STROKE APPLICATION filed Jun. 29, 2009, which is incorporated herein by reference for all purposes, which claims priority to U.S. Provisional Application No. 61/212,720 entitled FOLDING AVOIDANCE IN SKELETAL STROKE APPLICATION filed Apr. 14, 2009 which is incorporated herein by reference for all purposes.

BACKGROUND OF THE INVENTION

Graphics applications, such as Adobe® Illustrator®, allow a user to create and manipulate artwork. Some applications have a pattern brush feature that allows a user to apply a pattern to a path by placing copies of a tile along the path, where the tile has some tile pattern. When the path has a corner, there will be a gap in the corner unless the user provides a special corner tile to fill the corner. Creating such a special corner tile is difficult and therefore solutions for generating such a patterned corner tile would be desirable.

Skeletal strokes are a mechanism by which a piece of vector artwork designed with a straight spine is adapted to fit along a generalized curved path. Skeletal strokes forms the basis of various graphics applications (e.g., brush applications, such as Adobe® Illustrator® and Microsoft® Expressions Design®). Skeletal strokes is an aptly termed mechanism, because some of the intermediate constructions resemble a skeleton with a backbone and ribs.

BRIEF DESCRIPTION OF THE DRAWINGS

Various embodiments of the invention are disclosed in the following detailed description and the accompanying drawings.

FIGS. 10(*a*) and 10(*b*) illustrate mapped stroke artwork in which folding or creasing problems arise.

DETAILED DESCRIPTION

Figure 1:
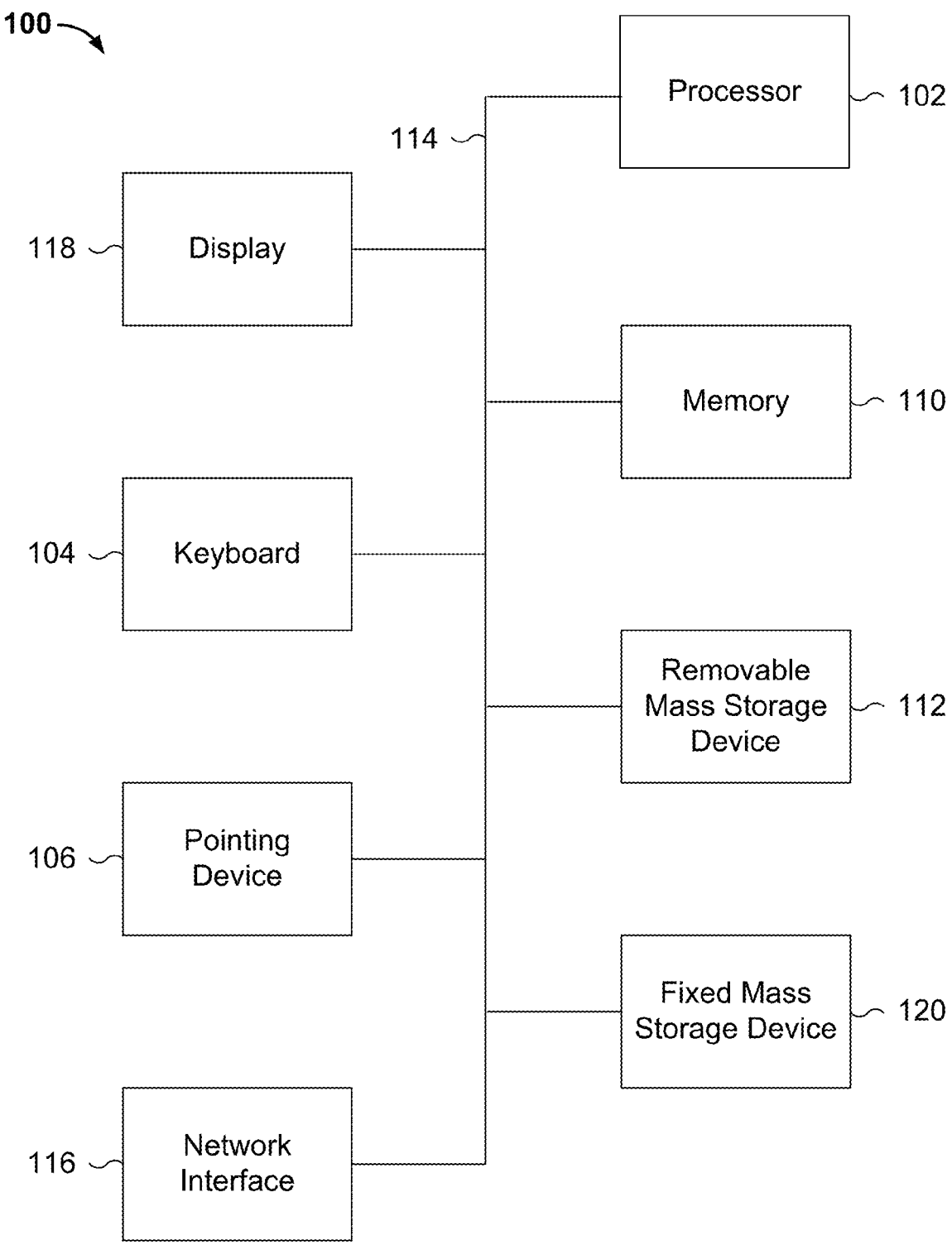
FIG. 1 is a functional diagram illustrating a programmed computer system for executing folding avoidance in skeletal stroke application in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Folding Avoidance in Skeletal Stroke Applications

Skeletal strokes are a mechanism by which a piece of vector artwork designed with a straight spine is adapted to fit along a generalized curved path (e.g., an arbitrary curved path, also referred to herein as a destination path, which, for example, is a path that is based on a user input). Skeletal strokes are used for various types of graphics applications (e.g., brush applications, such as Adobe® Illustrator® and Microsoft® Expressions Design®).

However, when the destination path turns corners or includes areas with a small radius of curvature (e.g., relative to a width of a source artwork, such as when the radius of curvature of the destination path is smaller/less than a width of the source artwork, or the radius of curvature equals zero (e.g., a corner)), the mapped artwork takes on a folded or creased appearance inside this area of the curve or corner (e.g., this problem is also referred to as creasing or folding as the mapped artwork in this area appears to be creasing or the artwork appears to be folding onto itself), which is generally an undesirable/unsatisfactory result for the mapped artwork.

Accordingly, folding avoidance in skeletal stroke application is provided that eliminates these folds or creases by adjusting the skeleton before using it to map/fit the source artwork to the destination path. In some embodiments, a centerline, such as a straight spine, or some other path/edge of the source artwork (e.g., a vector artwork, for which any artistic treatment can be applied to a path, such as the straight spine (also referred to as strokes, such as structured strokes, artwork strokes, or skeletal strokes)) is identified for applying the techniques disclosed herein. In some embodiments, folding avoidance in skeletal stroke application includes identifying a destination path for a source artwork and a plurality of ribs extending perpendicularly from the destination path, in which the source artwork is mapped onto the destination path; determining a contiguous region along the destination path including a subset of ribs; in which each of the subset of ribs in the contiguous region crosses another rib in the contiguous region that is not necessarily an adjacent rib; and adjusting each of the subset of ribs in the contiguous region so that each of the ribs no longer crosses another rib in the contiguous region to provide a modified subset of ribs. In some embodiments, the destination path includes one or more segments, each of which can be curved or straight. Accordingly, the source artwork can then be adapted to fit along the destination path using the adjusted ribs.

FIG. 1 is a functional diagram illustrating a programmed computer system for executing folding avoidance in skeletal stroke application in accordance with some embodiments. As shown, FIG. 1 provides a functional diagram of a general purpose computer system programmed to perform folding avoidance in skeletal stroke application in accordance with some embodiments. As will be apparent, other computer system architectures and configurations can be used to perform context sensitive script editing for form design. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 performs/executes the functionality described below with respect FIGS. 2 through 20 and/or performs/executes the processes described below with respect to FIGS. 21 through 23

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
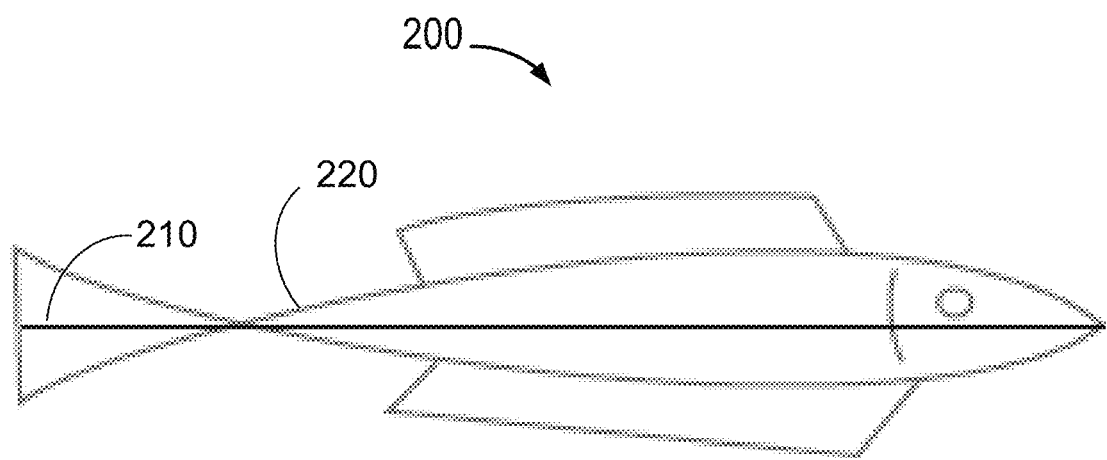
FIG. 2 illustrates a stroke artwork including a straight spine in accordance with some embodiments.

FIG. 2 illustrates a stroke artwork including a straight spine in accordance with some embodiments. As shown, FIG. 2 illustrates a stroke artwork 200 (e.g., a source artwork) including a straight spine 210 and a path 220. As will be appreciated, stroke artwork 200 includes several different paths, including the path 220, which define the stroke artwork 200.

Figure 3:
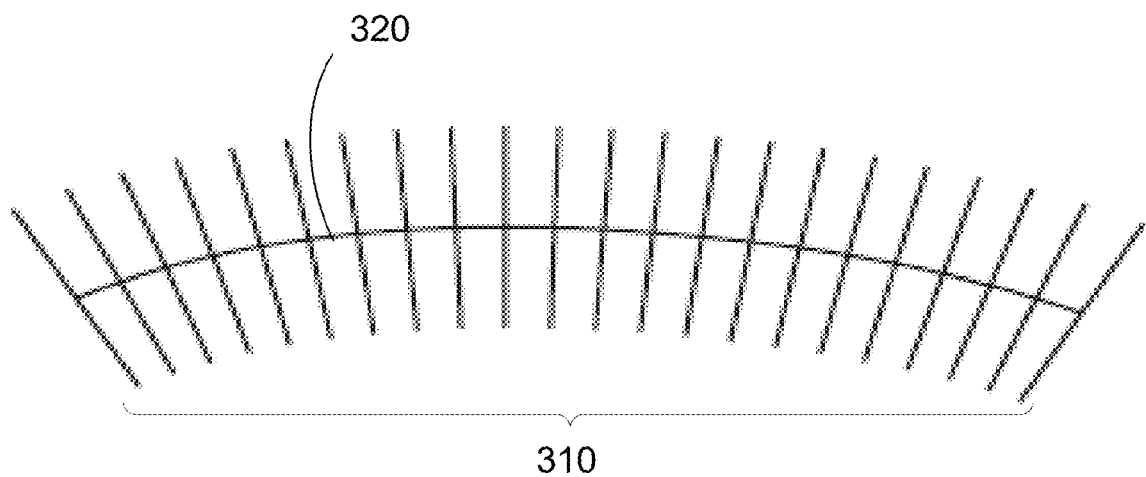
FIG. 3 illustrates a destination path intersected with a set of ribs in accordance with some embodiments.

FIG. 3 illustrates a destination path 320 intersected with a set of ribs 310 in accordance with some embodiments. As shown, each of the ribs of the set of ribs 310 intersect the destination path 320 perpendicularly. In some embodiments, a width of each of the ribs of the set of ribs 310 is equal to a width (e.g., maximum width) of the stroke artwork 200. In some embodiments, each of the ribs of the set of ribs 310 is equidistant from adjacent ribs. In some embodiments, each of the ribs of the set of ribs 310 is closer to adjacent ribs in areas in which the radius of curvature is smaller (e.g., where the destination path 320 curves more). In some embodiments, the set of ribs 310 include a greater number of ribs than shown in FIG. 3 and are much closer together than shown in FIG. 3.

Figure 4:
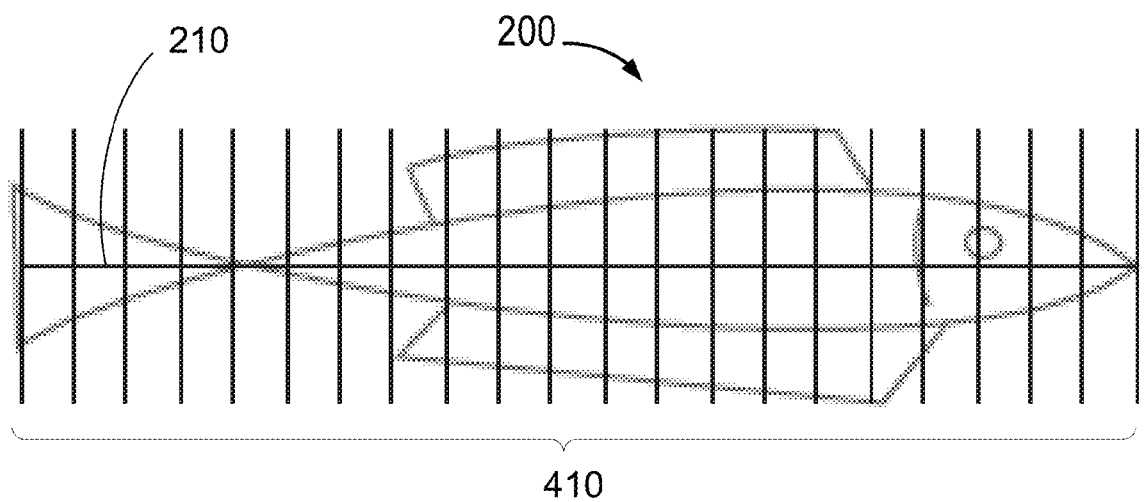
FIG. 4 illustrates the stroke artwork of FIG. 2 including the straight spine intersected with a set of ribs in accordance with some embodiments.

FIG. 4 illustrates the stroke artwork 200 of FIG. 2 including the straight spine 210 intersected with a set of ribs 410 in accordance with some embodiments. As shown, each of the ribs of the set of ribs 410 intersect the straight spine 210 perpendicularly. Also as shown, a width of each of the ribs of the set of ribs 410 is equal to a width of the stroke artwork 200. In some embodiments, the set of ribs 410 is distributed along the straight spine 210 in the same manner that the set of ribs 310 is distributed along the destination path 220 as shown in and discussed with respect to FIG. 3. In some embodiments, each of the ribs of the set of ribs 410 is equidistant from adjacent ribs. In some embodiments, each of the ribs of the set of ribs 410 is closer to adjacent ribs in areas in which the radius of curvature of a path of the stroke artwork 200 is smaller (e.g., where a path of the stroke artwork 200 curves more). In some embodiments, the set of ribs 410 include a greater number of ribs than shown in FIG. 4 and are much closer together than shown in FIG. 4.

Figure 5:
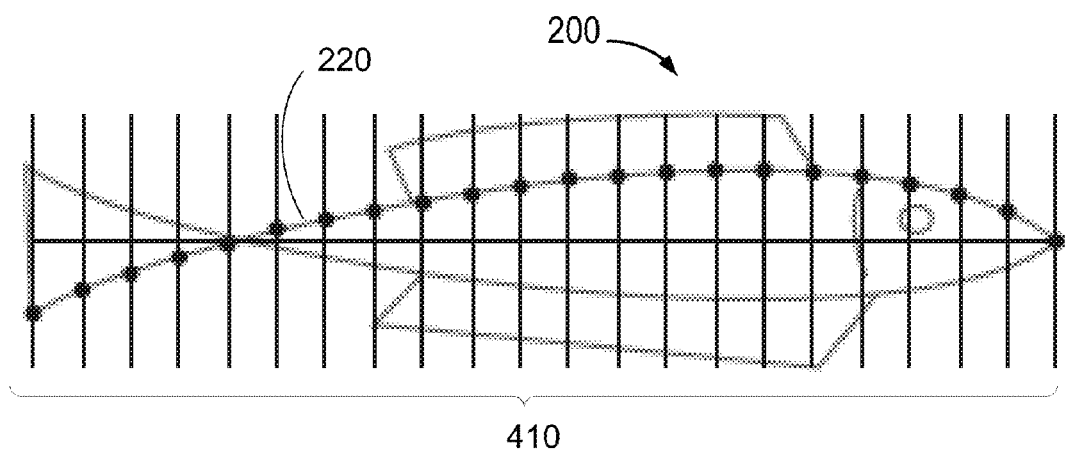
FIG. 5 illustrates the stroke artwork of FIG. 2 including the path intersected with the set of ribs in accordance with some embodiments.

FIG. 5 illustrates the stroke artwork 200 of FIG. 2 including the path 220 intersected with the set of ribs 410 in accordance with some embodiments. As shown, where the path 220 crosses/intersects each rib of the set of ribs 410 is determined. In some embodiments, this process is repeated for each path of the stroke artwork 200 of FIG. 2.

Figure 6:
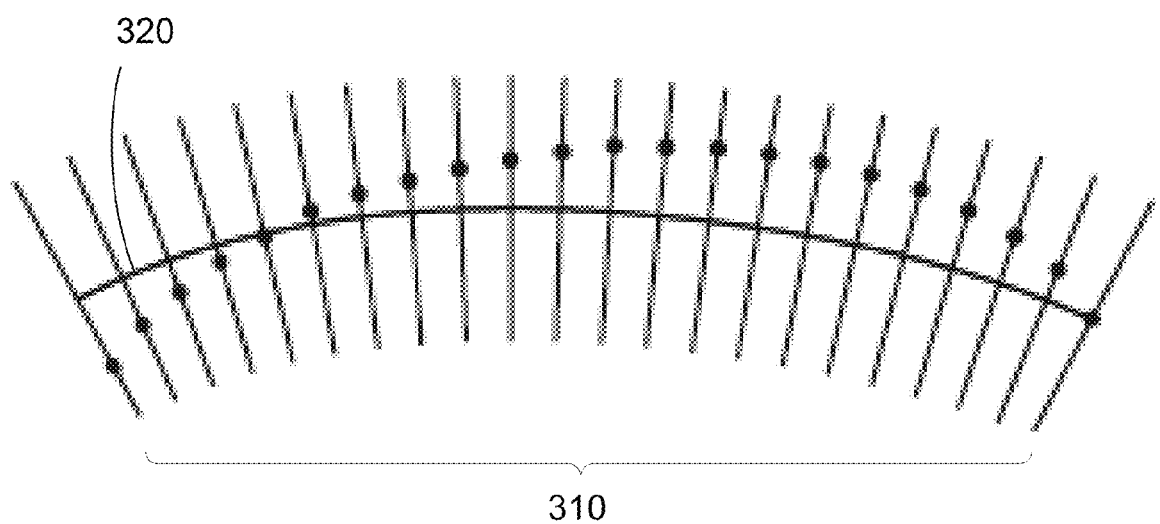
FIG. 6 illustrates the destination path of FIG. 3 intersected with the set of ribs including a mapping of the path in accordance with some embodiments.

FIG. 6 illustrates the destination path 320 of FIG. 3 intersected with the set of ribs 310 including a mapping of the path 220 in accordance with some embodiments. As shown, where the path 220 crossed each rib of the set of ribs 410 as shown in FIG. 5 is used to map the path 220 to the set of ribs 310. For example, a distance from each intersection of the path 220 with each rib of the set of ribs 410 to the spine 210 is determined as shown in FIG. 5, and those respective distances for each corresponding rib are mapped using such distances relative to the destination path 320 as shown in FIG. 6. For example, the intersection points in FIG. 6 are proportionally (relative to the width of the ribs) the same distance from the spine as in FIG. 5. In some embodiments, this process is repeated for each path of the stroke artwork 200 of FIG. 2.

Figure 7:
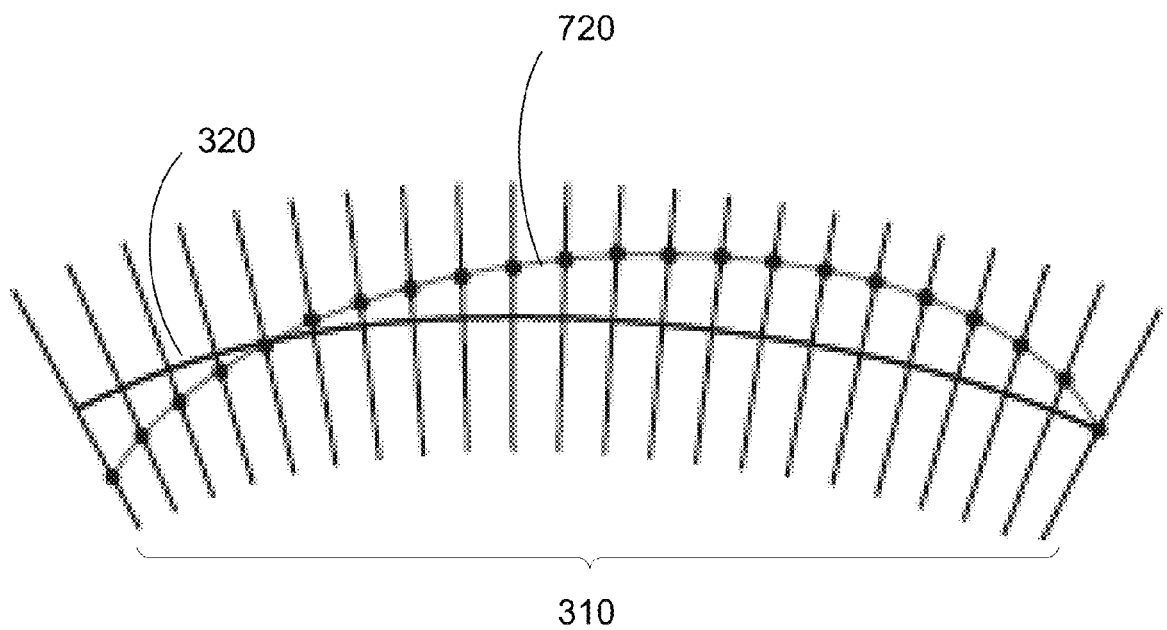
FIG. 7 illustrates a mapped path in accordance with some embodiments.

FIG. 7 illustrates a mapped path 720 in accordance with some embodiments. As shown, the mapped path 720 is fitted based on the mapped/fitted path as shown in FIG. 6 (e.g., using any curve fitting technique, such as determining a distance from the spine 210 in FIG. 5 for each crossing/intersection of the path 210 with each rib of the set of ribs 410 and using that distance to fit the path 220 to the ribs 310 relative to the destination path 320). In some embodiments, this process is repeated for each path of the stroke artwork 200 of FIG. 2, which provides the resulting mapped stroke artwork shown in FIG. 8 (shown with the ribs 310) and FIG. 9 (shown without the ribs 310).

Figure 8:
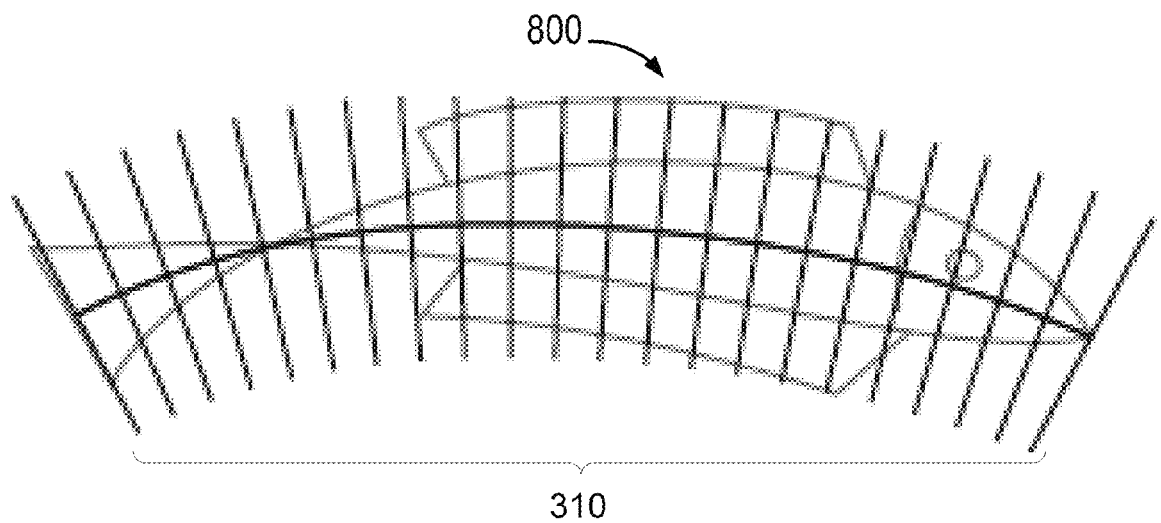
FIG. 8 illustrates the stroke artwork of FIG. 2 fit to the destination path of FIG. 3 shown with the set of ribs in accordance with some embodiments.

FIG. 8 illustrates the stroke artwork 200 of FIG. 2 fit to the destination path 320 of FIG. 3 shown with the set of ribs 310 in accordance with some embodiments. As shown, a mapped stroke artwork 800 is provided, and is shown with the set of ribs 310.

Figure 9:
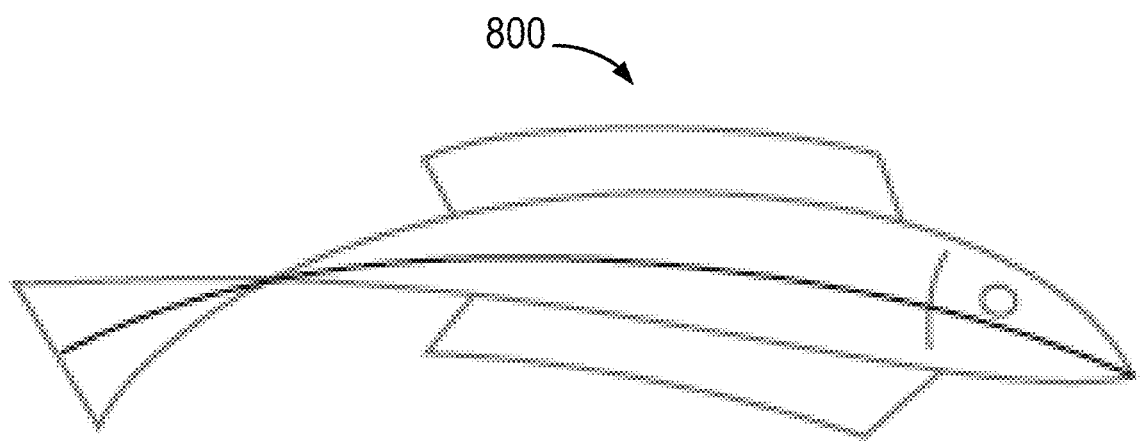
FIG. 9 illustrates the stroke artwork of FIG. 2 fit to the destination path of FIG. 3 in accordance with some embodiments.

FIG. 9 illustrates the stroke artwork 200 of FIG. 2 fit to the destination path 320 of FIG. 3 in accordance with some embodiments. As shown, the mapped stroke artwork 800 of FIG. 8 is provided, and is shown without the set of ribs 310.

FIGS. 10(*a*) and 10(*b*) illustrate mapped stroke artwork in which folding or creasing problems arise. As shown, problems arise when the destination path has a sharp turn or a corner. In particular, merely applying the techniques described above with respect to FIGS. 2 through 9 provides the results shown in FIGS. 10(*a*) and 10(*b*), which are generally not the user expected or desired results for a mapping/fitting of a source artwork to a destination path. For example, on the inside of the turn or corner of each of these mapped stroke artworks, the stroke artwork folds over upon itself. For example, referring to FIG. 10(*b*), which depicts a stroke artwork with a corner, the stroke artwork cuts off the outside of the corner as shown.

Generally, these folding/creasing problems arise wherever the radius of curvature of the destination path is smaller than the width of the stroke artwork (e.g., a maximum width of the stroke artwork). A corner is a special case of this problem, because the radius of curvature at a corner is 0. As discussed further below, this folding/creasing problem generally occurs in such problem areas, because these situations result in certain ribs of the set of ribs constructed for the destination path to cross/intersect each other in the problem areas, as shown in FIG. 12. Accordingly, in some embodiments, as described in detail below, identifying these problem areas and then adjusting the ribs in these problem areas so the skeletons look like, for example, FIGS. 13(*a*) and 13 (*b*), achieves the desired results, for example, shown in FIGS. 11(*a*) and 11(*b*), respectively.

Figures 11, 11A, 11B:
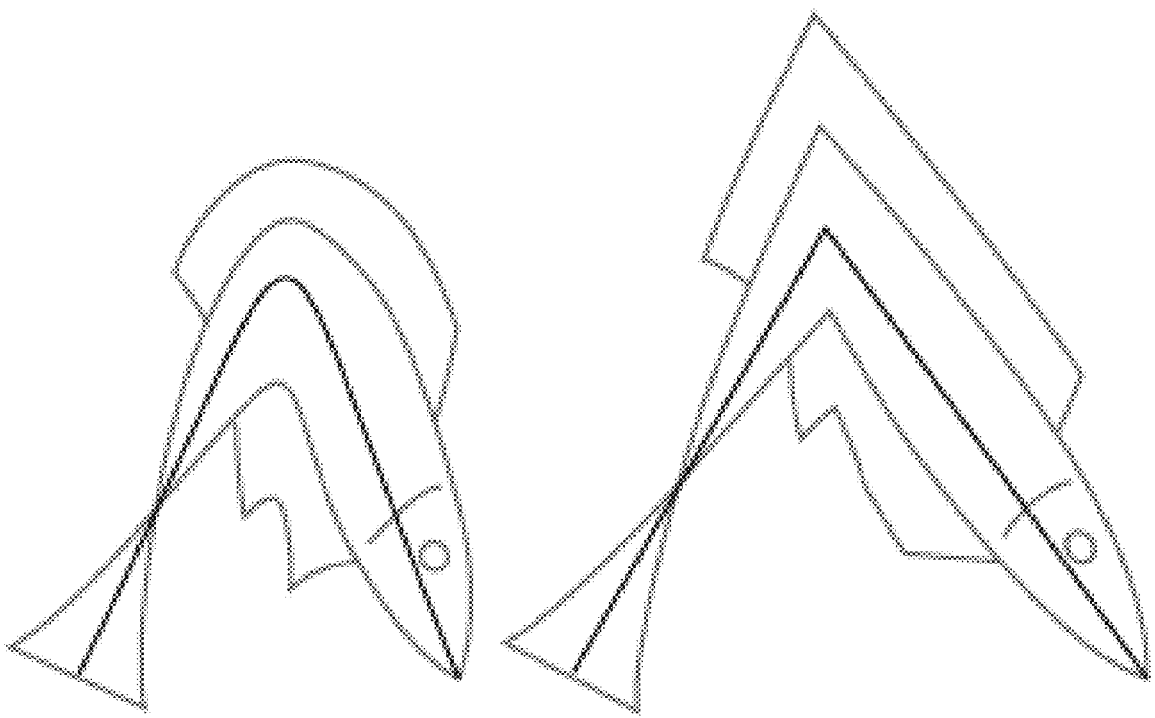
FIGS. 11(*a*) and 11(*b*) illustrate mapped stroke artwork using folding avoidance in skeletal stroke application in accordance with some embodiments.
Figures 12, 12A, 12B:
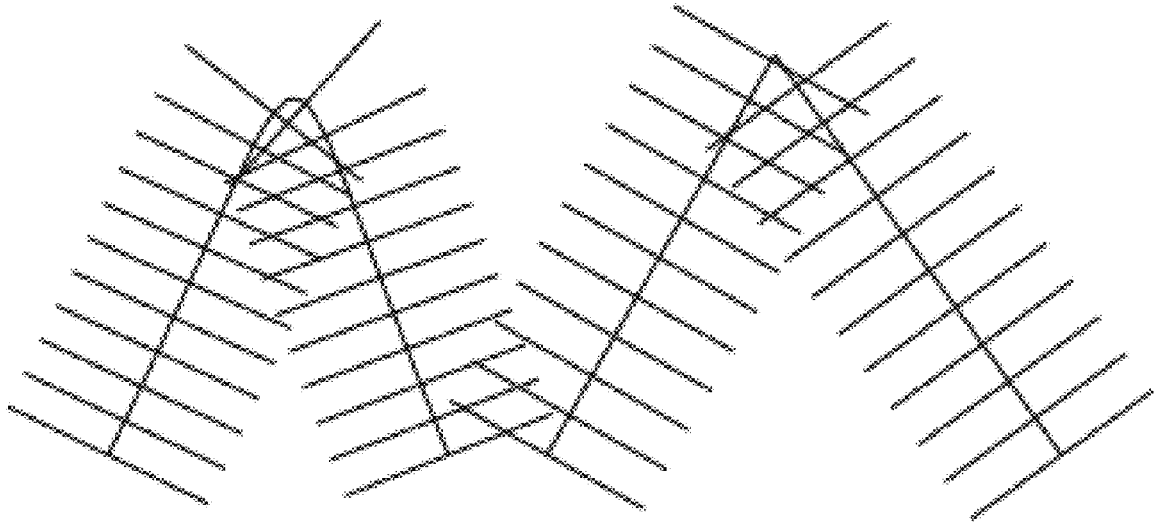
FIGS. 12(*a*) and 12(*b*) illustrate a destination path intersected with a set of ribs.

FIGS. 11(*a*) and 11(*b*) illustrate mapped stroke artwork using folding avoidance in skeletal stroke application in accordance with some embodiments. In contrast to FIGS. 10(*a*) and 10(*b*), applying the folding avoidance in skeletal stroke application as described below, provides results that are generally what users would expect for a mapping/fitting of a source artwork to a destination path.

FIGS. 12(*a*) and 12(*b*) illustrate a destination path intersected with a set of ribs. As shown, certain ribs intersect other ribs in problem areas (e.g., the sharp curve of FIG. 12(*a*) and the corner of FIG. 12(*b*)).

Figure 13:
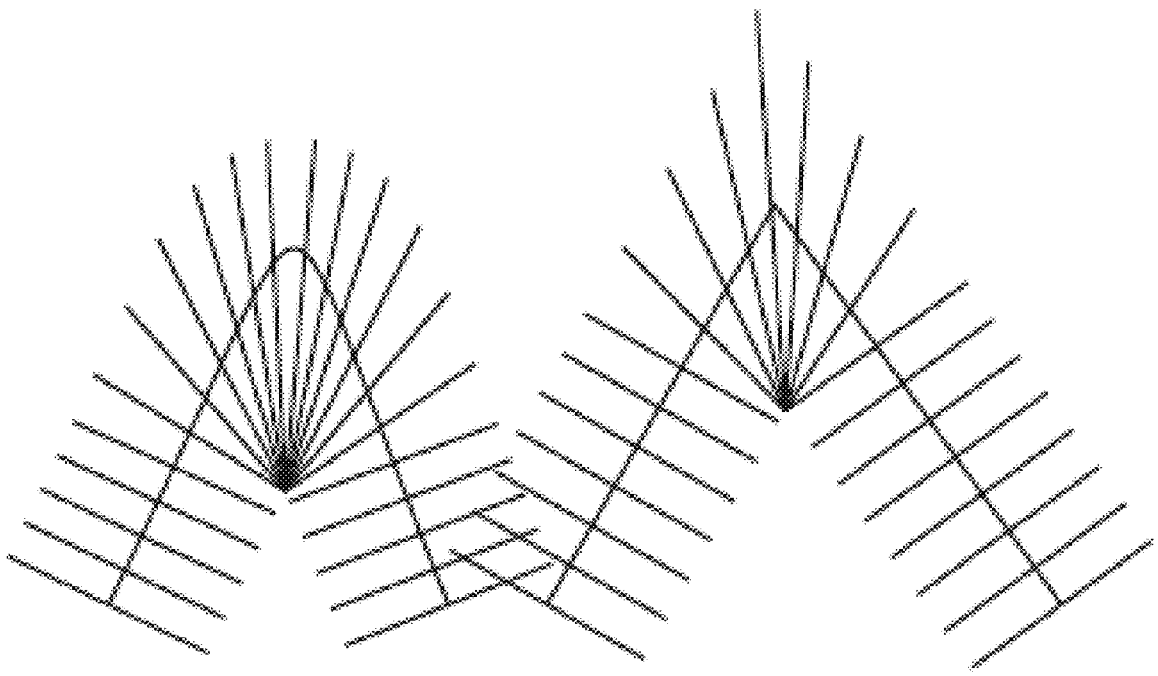
FIGS. 13(*a*) and 13(*b*) illustrate a destination path intersected with a modified subset of ribs in accordance with some embodiments.

FIGS. 13(*a*) and 13(*b*) illustrate a destination path intersected with a modified subset of ribs in accordance with some embodiments. As shown and as described further below, a subset of ribs (e.g., in the problem area, as described further below) are adjusted/modified so that they no longer intersect any other rib. In some embodiments, a subset of ribs are adjusted/modified to provide a subset of ribs that no longer intersect any other rib by relaxing the following requirements: (1) ribs need not be perpendicular to the destination path (e.g., the spine); and (2) ribs need not be of equal length (e.g., equal to a maximum width of a source artwork). Referring to FIG. 13(*a*), the modified subset of ribs are adjusted so that they no longer are required to intersect perpendicularly with the destination path, and the interior (below the path) length of the ribs are no longer equal in length relative to the unmodified ribs. Referring to FIG. 13(*b*), the modified subset of ribs are adjusted so that they no longer are required to intersect perpendicularly with the destination path, and both the exterior (above the path) and the interior (below the path) length of the ribs are no longer equal in length relative to the unmodified ribs. Accordingly, a subset of the ribs are adjusted to provide the modified ribs as shown in FIGS. 13(*a*) and 13(*b*). As will be appreciated, various approaches are described herein for adjusting a subset of the ribs to provide a modified subset of ribs so that they no longer intersect with any other rib.

Figure 14:
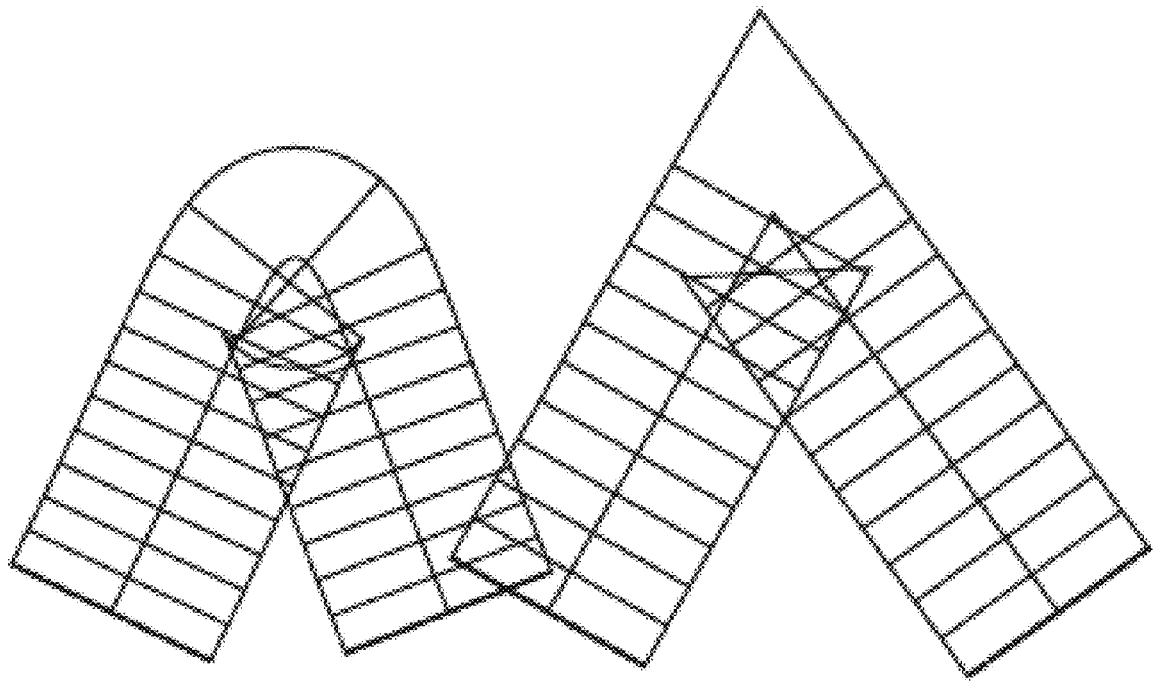
FIGS. 14(*a*) and 14(*b*) illustrate a destination path intersected with a set of ribs and a stroke envelope in accordance with some embodiments.

FIGS. 14(*a*) and 14(*b*) illustrate a destination path intersected with a set of ribs and a stroke envelope in accordance with some embodiments. As similarly shown in FIGS. 12(*a*) and 12(*b*), respectively, certain ribs intersect other ribs in the problem areas (e.g., the sharp curve of FIG. 12(*a*) and the corner of FIG. 12(*b*)). As shown in FIGS. 14(*a*) and 14(*b*), the stroke envelope is provided as the outer paths connecting the set of ribs. For example, the stroke envelope can be constructed by using a simple rectangle as the stroke artwork. As another example, the stroke envelope can be constructed by smoothly connecting the outsides ends of the ribs as applied to the path. In the case of a corner, the stroke envelope can be constructed as described above with the additional requirement that the stroke envelope does not have the corner cut off, which is what would result if the outsides of the ribs are connected directly; instead, the edges of the envelope are extended in a straight line on the outside of the corner, and the stroke envelope follows these extended edges to their intersection, as shown in FIG. 14(*b*).

Figures 15, 15A, 15B:
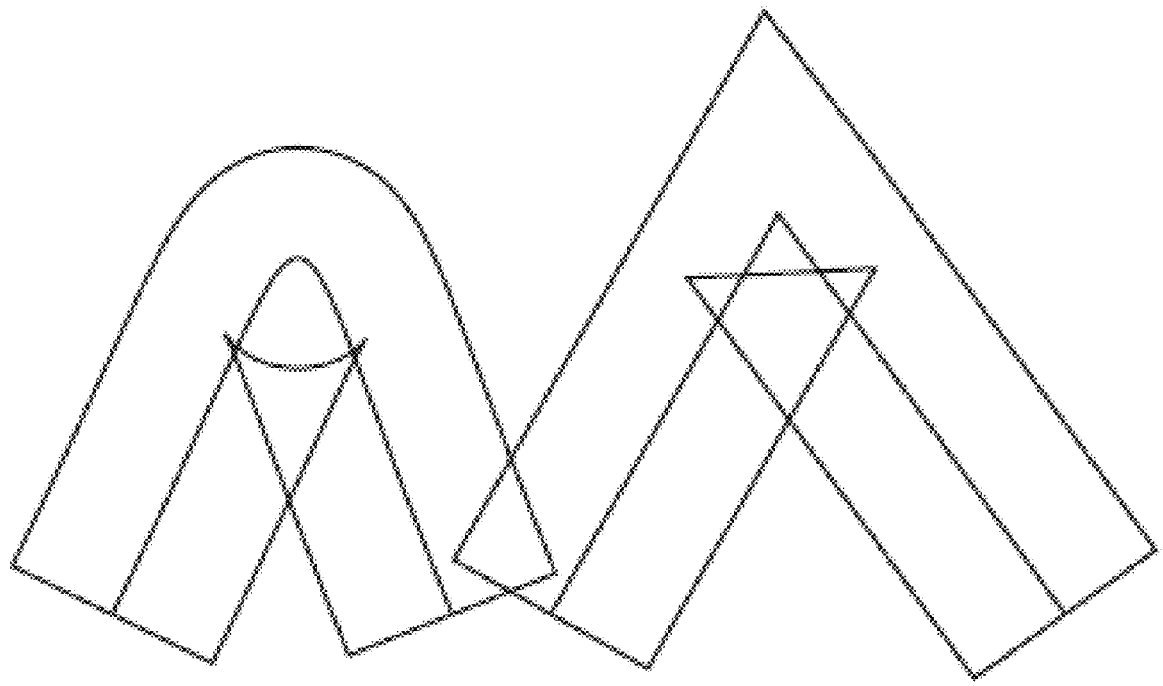
FIGS. 15(*a*) and 15(*b*) illustrate a destination path with a stroke envelope.

FIGS. 15(*a*) and 15(*b*) illustrate a destination path with a stroke envelope. As shown, FIGS. 15(*a*) and 15(*b*) illustrate the stroke envelopes of FIGS. 14(*a*) and 14(*b*), respectively, but without the set of ribs depicted. Also as shown, each envelope has an area where the interior stroke envelope edge "goes backwards" on the inside of the turn or corner, which corresponds to a unique characteristic associated with these problem areas (e.g., the sharp turn depicted in FIG. 15(*a*) and the corner depicted in FIG. 15(*b*)) that give rise to creasing or folding, as further discussed below.

Figure 16:
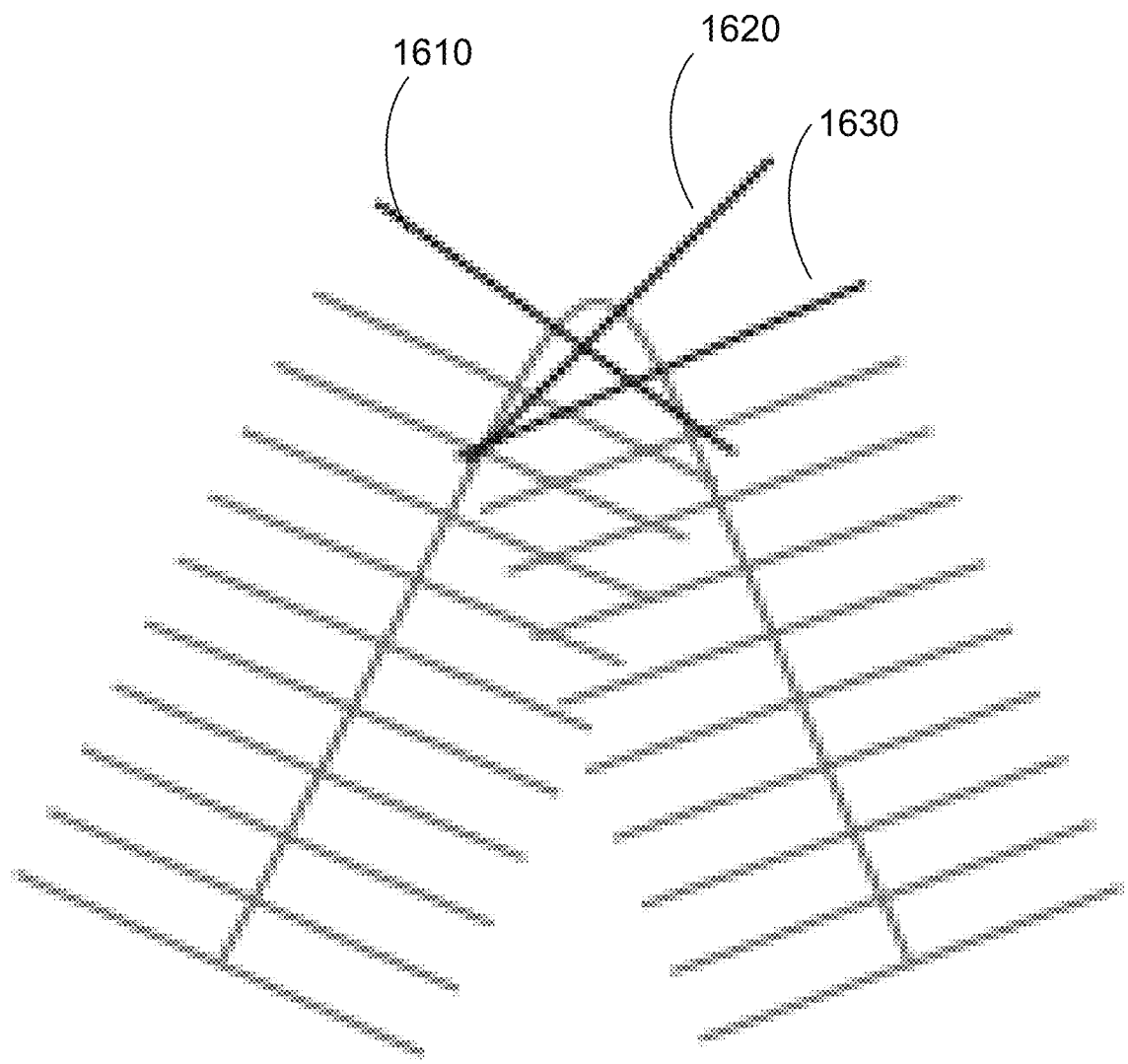
FIG. 16 illustrates an identification of adjacent ribs crossing each other in accordance with some embodiments.

FIG. 16 illustrates an identification of adjacent ribs crossing each other in accordance with some embodiments. To provide folding avoidance in skeletal stroke application, the problem areas (e.g., sharp turns or curves of the destination path) are determined. Referring to FIG. 16, the problem areas are determined in part by determining an area of the destination path where adjacent ribs cross or intersect each other. As shown, the adjacent crossing ribs are ribs 1610, 1620 and 1630. For example, as will be appreciated, identifying adjacent crossing ribs can be determined using any appropriate curve/path intersection technique.

In some embodiments, the radius of curvature is used to determine these problem areas. For example, as will be appreciated, the radius of curvature of the path at any point can be computed using standard geometric techniques. In some embodiments, the radius of curvature is determined wherever a rib extends from the destination path, and at each corner. If the radius is less than a width of the stroke artwork (including the case where it is equal to zero, at a corner), then a problem area that requires adjustment is identified, and this area is extended outwards in both directions through all ribs that cross/intersect other ribs that are not necessarily adjacent ribs. In some embodiments, the radius of curvature is computed and stored as part of a process of constructing the set of ribs for the destination path.

Figure 17:
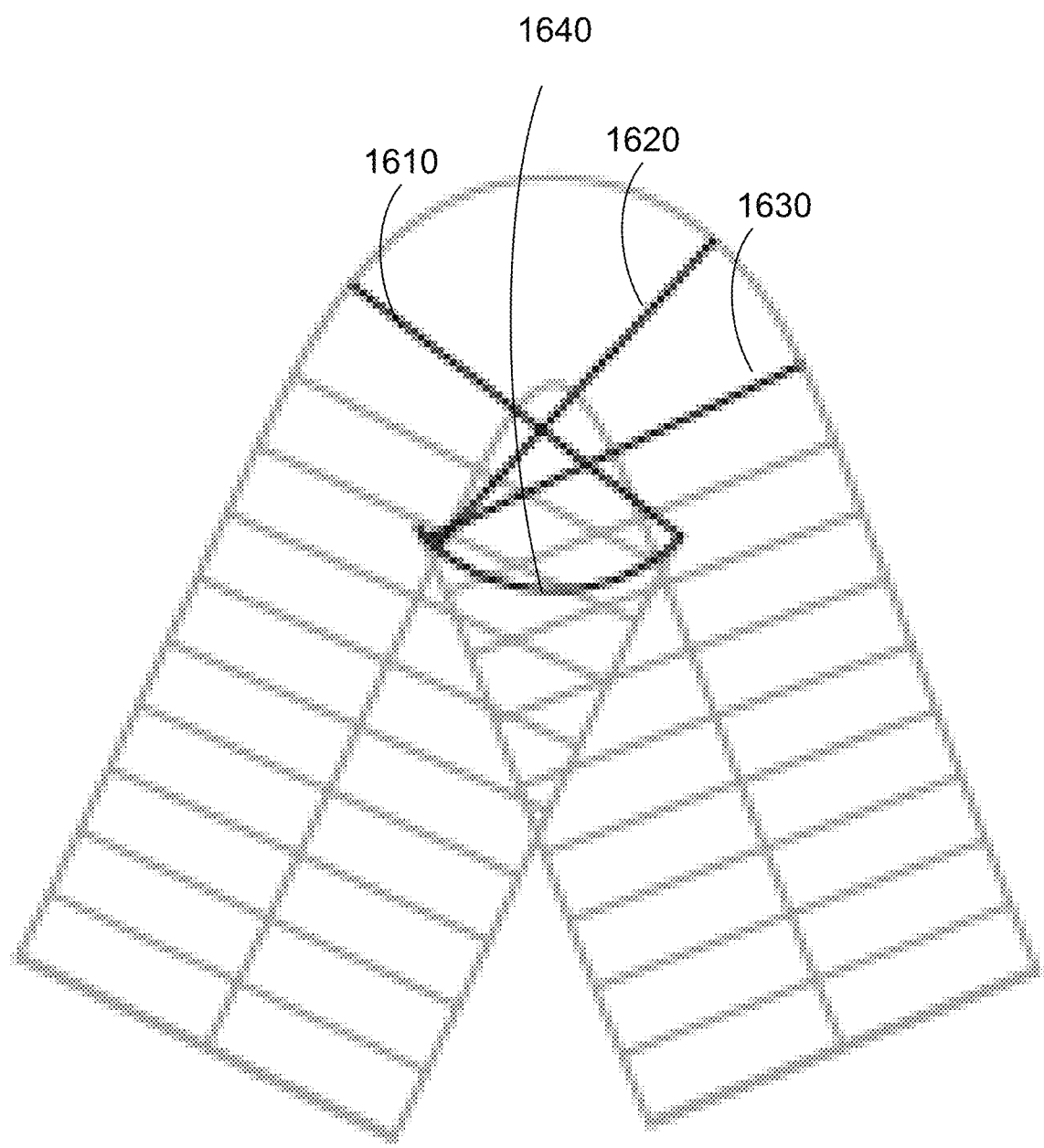
FIG. 17 illustrates an identification of adjacent ribs crossing each other and a retrograde path in accordance with some embodiments.

FIG. 17 illustrates an identification of adjacent ribs crossing each other and a retrograde path 1640 in accordance with some embodiments. As shown, FIG. 17 includes the intersecting ribs 1610, 1620, and 1630 as similarly shown in FIG. 16, along with the stroke envelope as similarly discussed above. In addition, as shown in FIG. 17, the retrograde path 1640 is shown that represents/defines the retrograde area, which is the area where the ribs cross the next adjacent rib and where the interior stroke envelope edge "goes backwards" when drawing the stroke envelope between the interior rib endpoints of the adjacent crossing ribs 1610, 1620, and 1630 (e.g., FIG. 17 shows that the adjacent crossing ribs 1610, 1620, and 1630 correspond to the portion of the stroke envelope that "goes backwards" inside the fold, on the inside of the turn).

Figure 18:
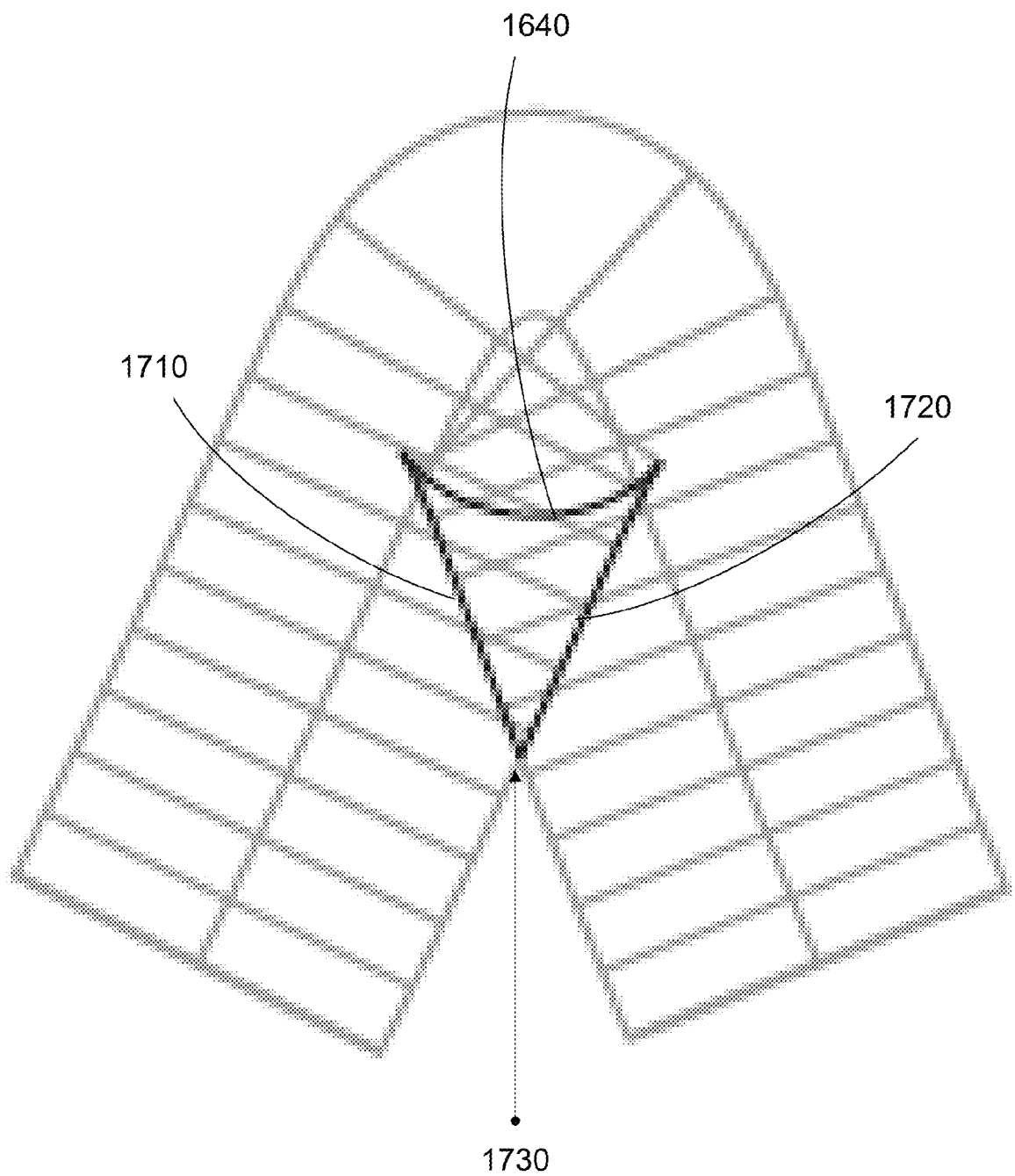
FIG. 18 illustrates an identification of a contiguous region along the destination path including a subset of ribs, in which each of the subset of ribs in the contiguous region crosses another rib in the contiguous region that is not necessarily an adjacent rib in accordance with some embodiments.

FIG. 18 illustrates an identification of a contiguous region along the destination path including a subset of ribs, in which each of the subset of ribs in the contiguous region crosses another rib in the contiguous region that is not necessarily an adjacent rib in accordance with some embodiments. As shown, paths 1710 and 1720 are determined based on where the interior stroke envelope edge intersects itself at the interior stroke envelope edge intersection point 1730 (e.g., using a standard curve/path intersection technique to identify the interior stroke envelope edge intersection point 1730), connecting the interior stroke envelope edge intersection point 1730 to respective ends of the retrograde path 1640 to provide paths 1710 and 1720, respectively (e.g., as shown in FIG. 17, having identified the backwards portion of the stroke envelope, the edge of the stroke envelope is traced out to where each of the ribs intersect, as shown in FIG. 18). As a result, the contiguous area is defined by the region defined by the retrograde path 1640 and the paths 1710 and 1720. Accordingly, the problem area is the area (e.g., triangle) defined by the adjacent ribs crossing (e.g., retrograde area) and the stroke envelope crossing point as shown in FIG. 18. Any rib that ends in this contiguous region along the destination path is included in the subset of ribs to be adjusted (e.g., a minimum subset of ribs requiring adjustment to provide folding avoidance in skeletal stroke application), which can be adjusted as described below to provide folding avoidance in skeletal stroke application.

Figure 19:
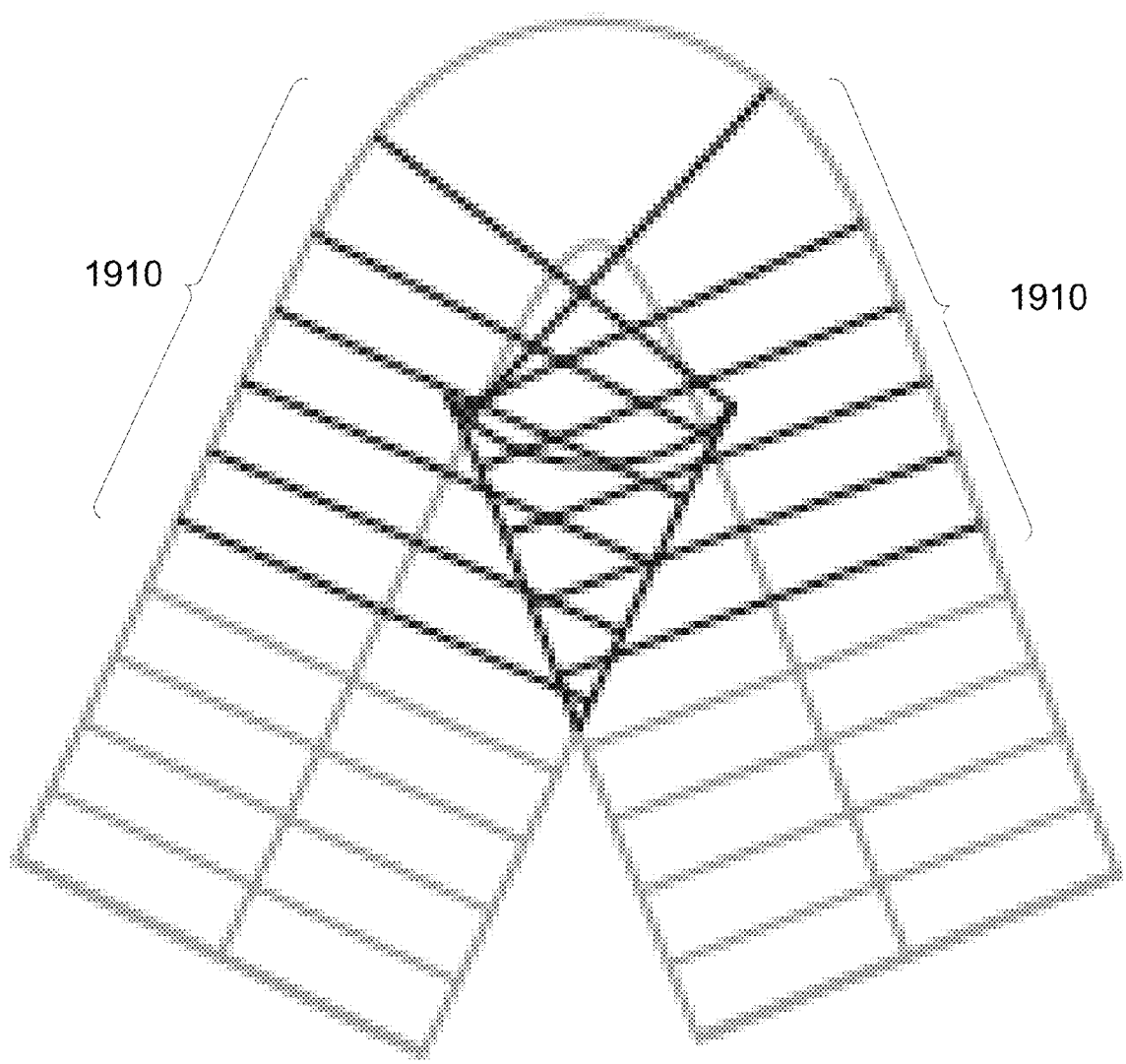
FIG. 19 illustrates the contiguous region of FIG. 18 along the destination path including a subset of ribs in accordance with some embodiments.

FIG. 19 illustrates the contiguous region of FIG. 18 along the destination path including a subset of ribs 1910 in accordance with some embodiments. As shown, each of the ribs in the subset of ribs 1910 in the contiguous region of FIG. 18 requires adjustment to provide folding avoidance in skeletal stroke application.

Figure 20:
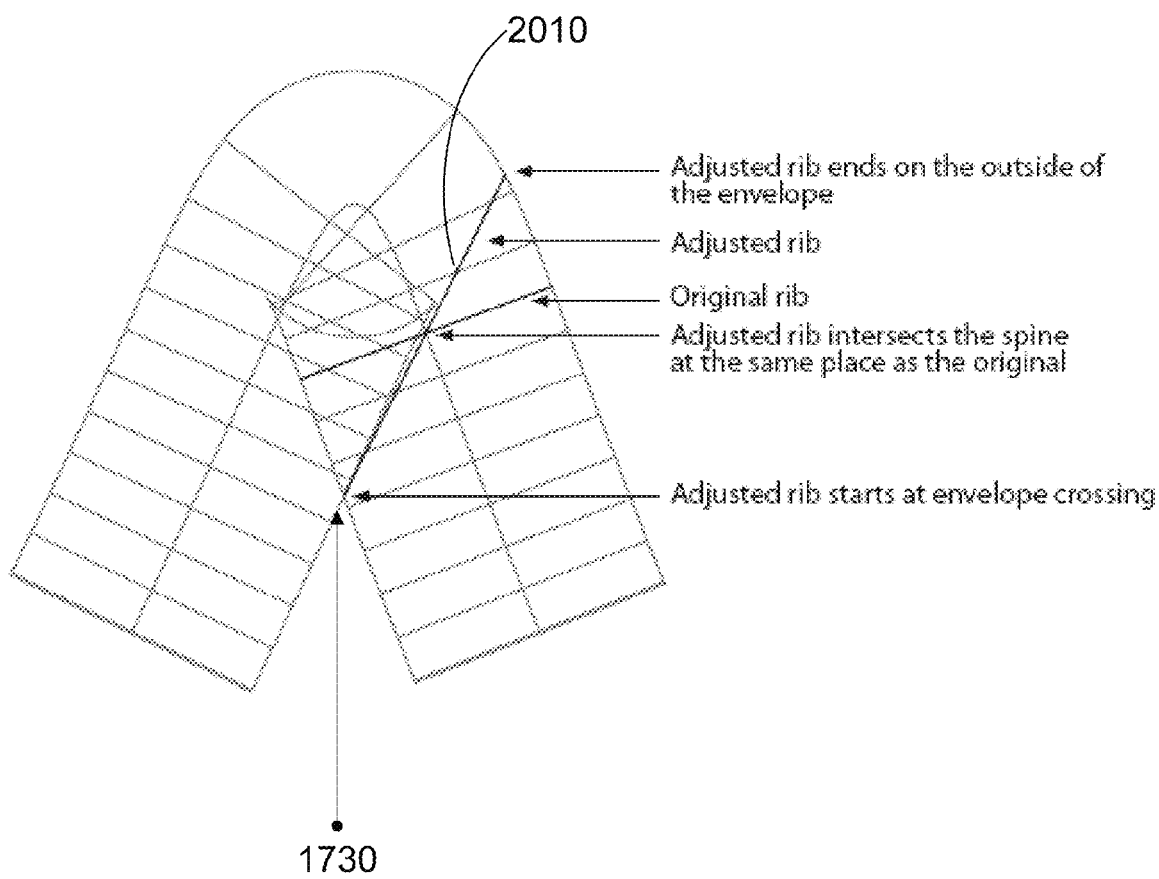
FIG. 20 illustrates an adjustment of each of the ribs in the subset of ribs in the contiguous region along the destination path in accordance with some embodiments.

FIG. 20 illustrates an adjustment of each of the ribs in the subset of ribs in the contiguous region along the destination path in accordance with some embodiments. As shown, the end of a rib 2010 on the inside of the turn or corner (interior) is moved to the point where the envelope edges intersect at the interior stroke envelope edge intersection point 1730. The rib 2010 then continues in a straight line through the point where the unadjusted rib intersects the destination path, and ends where the extended rib intersects the outer stroke envelope edge on the outside of the turn or corner. In particular, FIG. 20 shows the rib 2010 before and after adjustment. Performing this adjustment for each rib in the contiguous region along the destination path, results in the skeletons shown in, for example, FIGS. 13(a) and 13(b). In some embodiments, the interior of the ribs in the contiguous region along the destination path are adjusted to be shorter (e.g., to avoid a folding/creasing problem and ensure that the ribs do not intersect). In some embodiments, the exterior of the ribs in the contiguous region along the destination path are adjusted to be longer (e.g., for a corner problem area). In some embodiments, the ribs in the contiguous region along the destination path are adjusted so that the ribs no longer intersect the destination path perpendicularly. In some embodiments, the ribs in the contiguous region along the destination path are adjusted so that the ribs no longer are evenly spaced apart from each other. In some embodiments, the ribs in the contiguous region along the destination path are adjusted so that the ribs no longer are required to be straight and are, for example, allowed to bend (e.g., ribs can be provided that end on the outer edge of the stroke envelope as before any adjustment but are adjusted after crossing the destination path so as to end at the interior stroke envelope edge crossing point to avoid any crossing of ribs). As will be appreciated, various other adjustments can be provided to avoid crossing of ribs in the problem area(s) (e.g., the subset of ribs located in the contiguous region along the destination path).

In some embodiments, a destination path includes a compound bend like an S-curve that requires adjustment on both sides of the compound bend. In this example, there is a subset of ribs that lies within both problem areas that require adjusting and can be adjusted using either side's center of crossing. For example, a segment connecting the two centers of crossing can be constructed to determine where it crosses the destination path. Using this approach, each of the subset of ribs is adjusted according to which side of this crossing each of the ribs of the subset of ribs occurs on.

Figure 21:
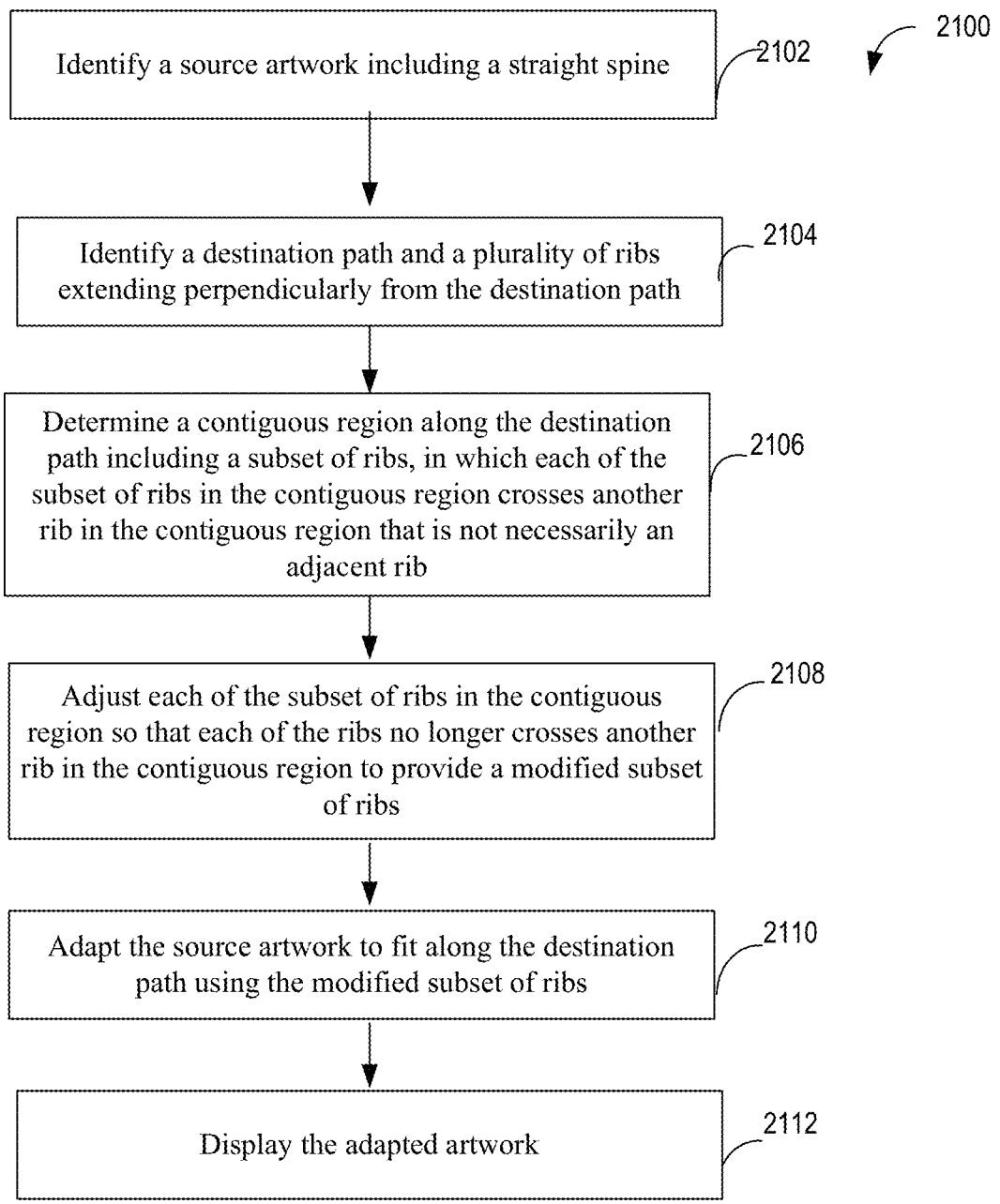
FIG. 21 is a flow chart for folding avoidance in skeletal stroke application in accordance with some embodiments.

FIG. 21 is a flow chart 2100 for folding avoidance in skeletal stroke application in accordance with some embodiments. At stage 2102, identify a source artwork including a straight spine is performed (e.g., executed using a processor 102 of computer system 100, such as a programmed computer system). At stage 2104, identify a destination path and a plurality of ribs extending perpendicularly from the destination path is performed (e.g., executed using a processor 102 of computer system 100), in which the source artwork is mapped onto the destination path. In some embodiments, a destination path is based on user input (e.g., using a graphics application executed using a processor 102 of computer system 100, such as a programmed computer system). In some embodiments, the destination path is a destination spine. At stage 2106, determine a contiguous region along the destination path including a subset of ribs is performed, in which each of the subset of ribs in the contiguous region crosses another rib in the contiguous region that is not necessarily an adjacent rib (e.g., executed using a processor 102 of computer system 100). In some embodiments, the contiguous region is greater than a retrograde area and less than an entire length of the destination path. In some embodiments, the contiguous region includes a plurality of adjacent ribs. At stage 2108, adjust each of the subset of ribs in the contiguous region so that each of the ribs no longer crosses another rib in the contiguous region to provide a modified subset of ribs is performed (e.g., executed using a processor 102 of computer system 100). In some embodiments, a width of each of the plurality of ribs is equal to a maximum width of the source artwork. In some embodiments, a width of each of the modified subset of ribs is not equal to a width of each of the plurality of ribs in the source artwork. In some embodiments, a width of each of the modified subset of ribs are not equal to a width of each of the plurality of ribs in the source artwork, and a width of each of a plurality of ribs located outside of the contiguous region are equal to the width of each of the plurality of ribs in the source artwork. At stage 2110, adapt the source artwork to fit along the destination path using the modified subset of ribs is performed (e.g., executed using a processor 102 of computer system 100). At stage 2112, display the adapted artwork is performed (e.g., executed using a processor 102 of computer system 100).

Figure 22:
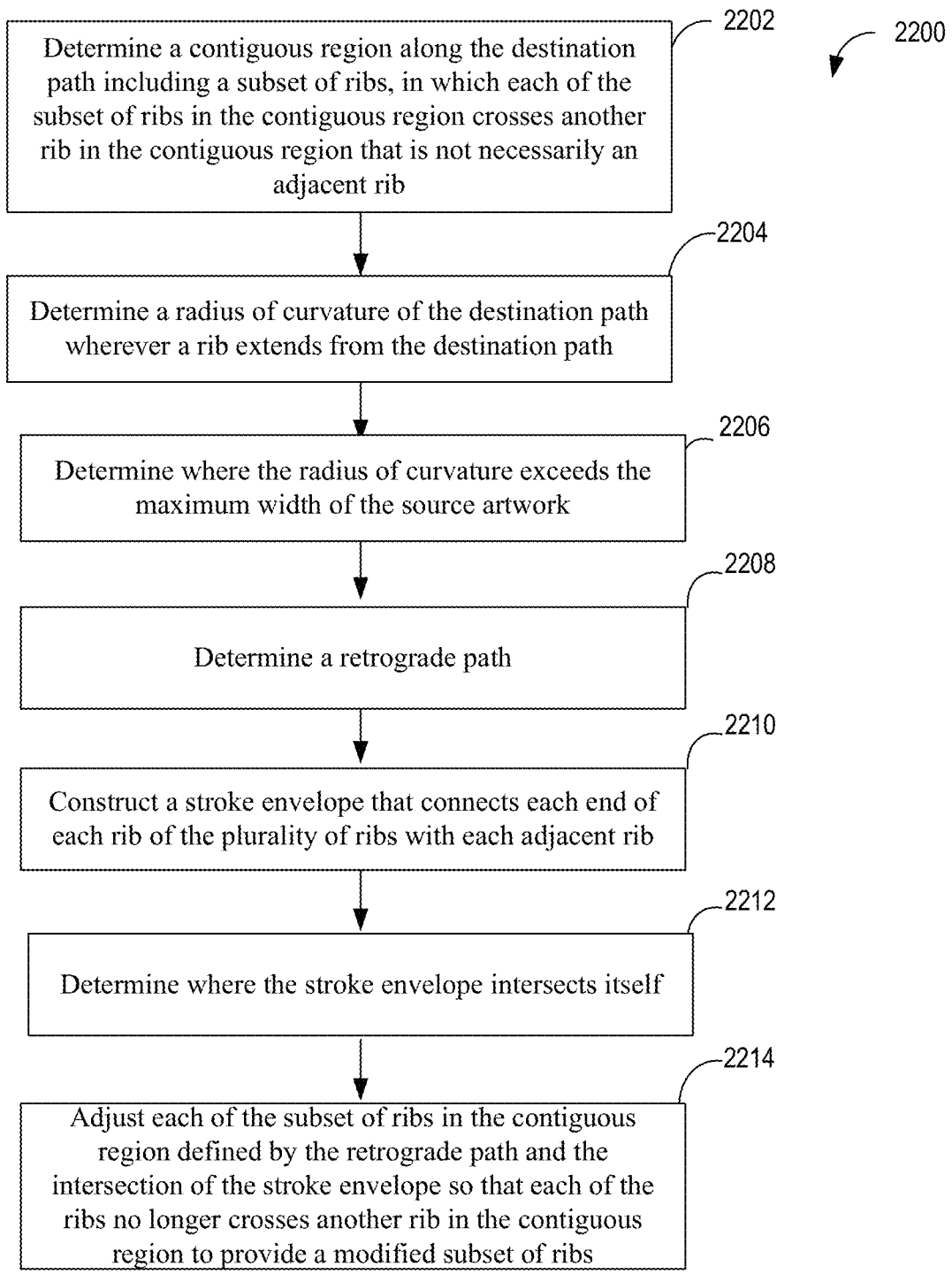
FIG. 22 is another flow chart for folding avoidance in skeletal stroke application in accordance with some embodiments.

FIG. 22 is another flow chart 2200 for folding avoidance in skeletal stroke application in accordance with some embodiments. At stage 2202, determine a contiguous region along the destination path including a subset of ribs is performed, in which each of the subset of ribs in the contiguous region crosses another rib in the contiguous region that is not necessarily an adjacent rib. At stage 2204, determine a radius of curvature of the destination path wherever a rib extends from the destination path is performed (e.g., executed using a processor 102 of computer system 100). At stage 2206, determine where the radius of curvature exceeds the maximum width of the source artwork is performed (e.g., executed using a processor 102 of computer system 100). At stage 2208, determine a retrograde path is performed (e.g., executed using a processor 102 of computer system 100). At stage 2210, construct a stroke envelope that connects each end of each rib of the plurality of ribs with each adjacent rib is performed (e.g., executed using a processor 102 of computer system 100). At stage 2212, determine where the stroke envelope intersects itself (e.g., an interior stroke envelope edge intersection point) is performed (e.g., executed using a processor 102 of computer system 100). In some embodiments, identify adjacent ribs that cross each other is performed to determine the problem area, and then identify each rib of the plurality of ribs that intersects with another rib of the plurality of ribs that is not necessarily an adjacent rib is performed to identify each of the ribs in the problem area that requires adjusting for folding avoidance in skeletal stroke application. At stage 2214, adjust each of the subset of ribs in the contiguous region defined by the retrograde path and the intersection of the stroke envelope so that each of the ribs no longer crosses another rib in the contiguous region to provide a modified subset of ribs is performed. In various embodiments, stages 2204-2212 are used to perform stage 2106 of FIG. 21 and/or stage 2108 is used to perform step 2108 of FIG. 21.

Figure 23:
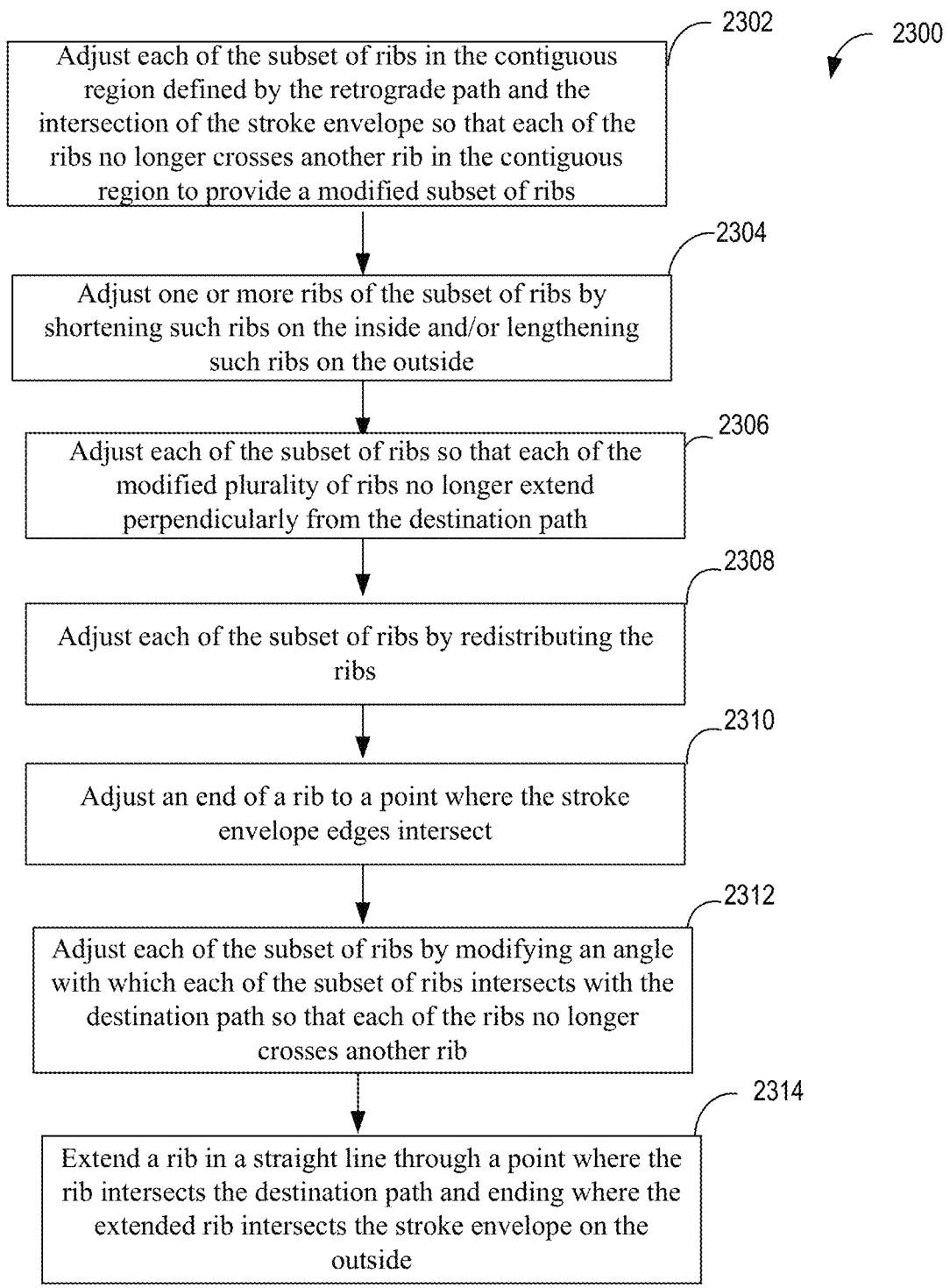
FIG. 23 is another flow chart for folding avoidance in skeletal stroke application in accordance with some embodiments.

FIG. 23 is another flow chart 2300 for folding avoidance in skeletal stroke application in accordance with some embodiments. At stage 2302, adjust each of the subset of ribs in the contiguous region defined by the retrograde path and the intersection of the stroke envelope so that each of the ribs no longer crosses another rib in the contiguous region to provide a modified subset of ribs is performed. At stage 2304, adjust one or more ribs of the subset of ribs by shortening such ribs on the inside and/or lengthening such ribs on the outside is performed (e.g., executed using a processor 102 of computer system 100). At stage 2306, adjust each of the subset of ribs so that each of the modified plurality of ribs no longer extend perpendicularly from the destination path is performed (e.g., executed using a processor 102 of computer system 100). At stage 2308, adjust each of the subset of ribs by redistributing the ribs is performed (e.g., executed using a processor 102 of computer system 100). At stage 2310, adjust an end of a rib to a point where the stroke envelope edges intersect is performed (e.g., executed using a processor 102 of computer system 100). At stage 2312, adjust each of the subset of ribs by modifying an angle with which each of the subset of ribs intersects with the destination path so that each of the ribs no longer crosses another rib is performed (e.g., executed using a processor 102 of computer system 100). At stage 2314, extend a rib in a straight line through a point where the rib intersects the destination path and ending where the extended rib intersects the stroke envelope on the outside is performed (e.g., executed using a processor 102 of computer system 100). In various embodiments, stages 2304-2314 are used to perform stage 2108 of FIG. 21 and/or stage 2214 of FIG. 22.

In some embodiments, these techniques are applied to a source artwork using a spine other than the centerline of the source artwork. For example, an edge (e.g., an outer side/edge) of the source artwork can be used as the spine by constructing a new source that is twice as wide as the original source artwork in which the original source artwork is entirely on one side of the center of the new source artwork. In this example, the centerline of this new source artwork would be one edge of the original source artwork. Those of ordinary skill in the art will appreciate that other spines, including curved spines, can be utilized for similarly applying the techniques disclosed herein.

In some embodiments, these techniques are applied using mapping mechanisms other than skeletal strokes. For example, when applying a selected spine with a set of ribs to a source artwork, the source artwork can also be viewed as a set of rectangles in which the ribs, the centerline or spine and the outer edge of the source artwork form the bounds/edges of such quadrilaterals. In this example, upon mapping these quadrilaterals onto the destination path with its ribs, it will be apparent that an equal number of the quadrilaterals are no longer rectangles. Thus, each source rectangle is mapped onto the corresponding destination quadrilateral. Those of ordinary skill in the art will appreciate that other mapping mechanisms can be utilized for similarly applying the techniques disclosed herein.

Automatic Corner Generation

Figure 24:
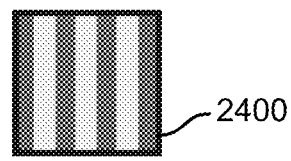
FIG. 24 is a diagram illustrating an example patterned tile.

FIG. 24 is a diagram illustrating an example patterned tile. In this example, patterned tile 2400 is a side tile. In general, the pattern brush feature allows the specification of a patterned side tile to apply to a straight portion of the path, and other special tiles to apply to corner portions of the path, such as a left corner tile and a right corner tile. Often, a patterned side tile is available, but not a patterned corner tile. Creating this patterned corner tile is difficult and beyond the abilities of most users. Some solutions yield undesirable results, such as corner tiles that are aesthetically unappealing to the user.

Various techniques for automatically generating corner treatments are disclosed. In particular, techniques that are more likely to yield resulting patterned corner tiles that are aesthetically acceptable to the user are disclosed.

Figure 25:
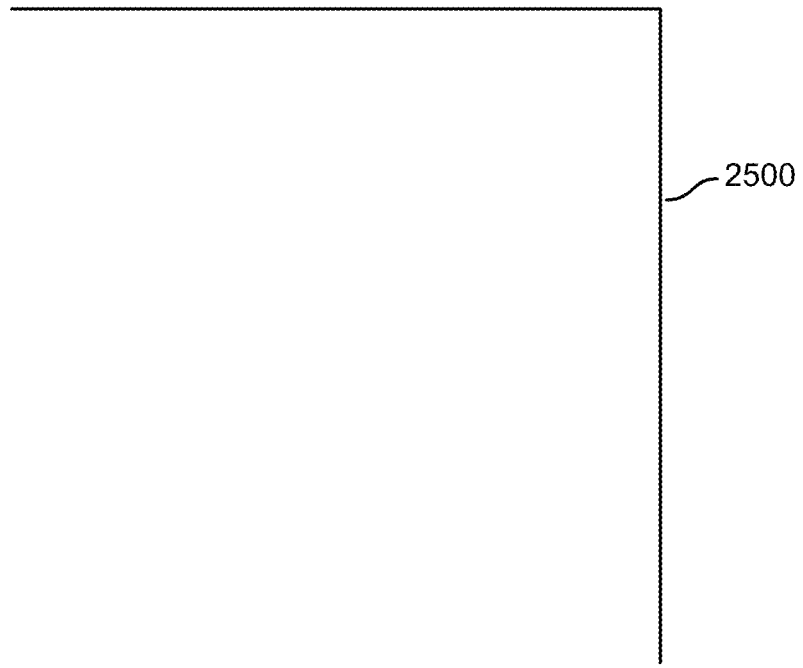
FIG. 25 is a diagram illustrating an example path having a corner.

FIG. 25 is a diagram illustrating an example path having a corner. In this example, path 2500 is shown to have a corner that is a right angle. As used herein, a corner of a path occurs where the derivative along the path has a discontinuity (i.e., the path has an angle). The path itself may be straight or curved on either side where it meets the corner. As used herein, a corner portion of a path includes the portion of the path to which a special tile(s) is applied, where a special tile is any tile other than a side tile. Thus, a patterned corner tile is a special tile that may be applied to a corner portion of a path.

Figure 26:
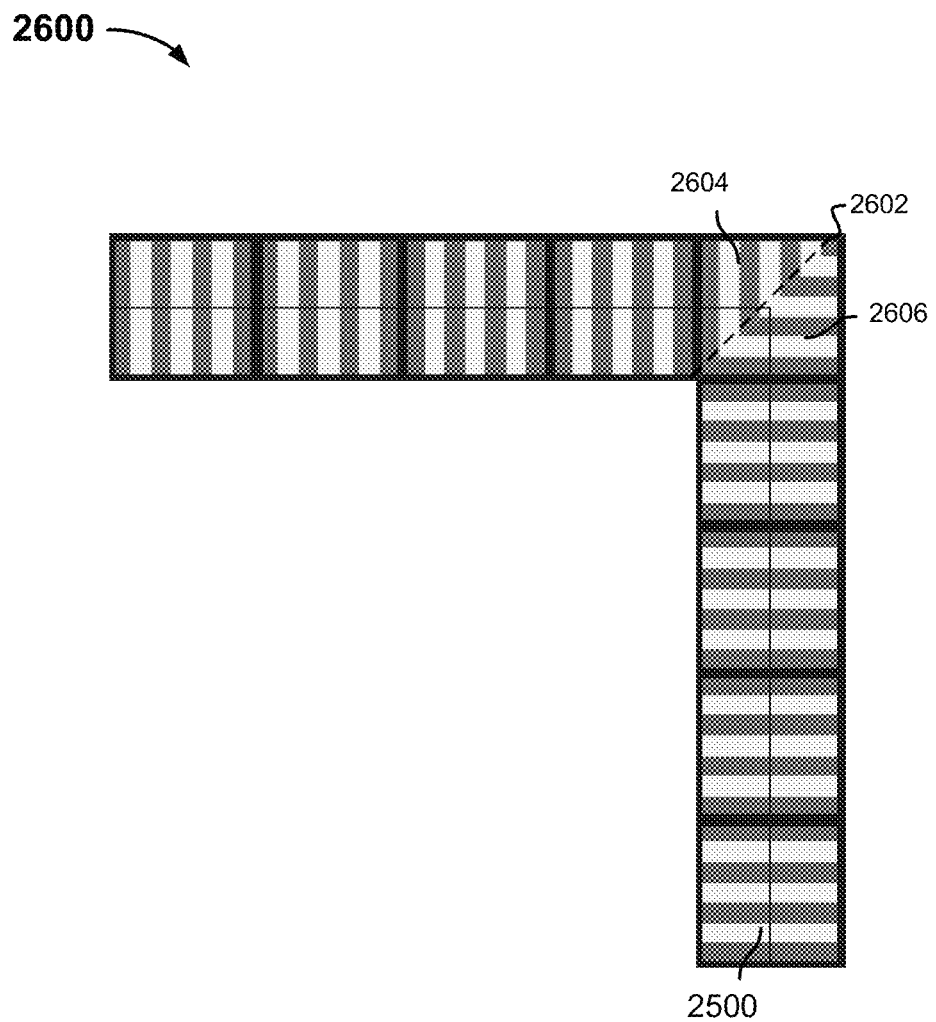
FIG. 26 is a diagram illustrating an example of applying a patterned tile to a path where the corner tile is generated by slicing a side tile diagonally.

FIG. 26 is a diagram illustrating an example of applying a patterned tile to a path where the corner tile is generated by slicing a side tile diagonally. In example artwork 2600, 4 patterned side tiles are applied to the top side of path 2500 and 4 patterned side tiles are applied to the right side of path 2500. The thick black lines indicate the division between tiles. Patterned corner tile 2602 is applied to the corner portion of path 2500. In some embodiments, patterned corner tile 2602 is automatically generated.

Figure 27:
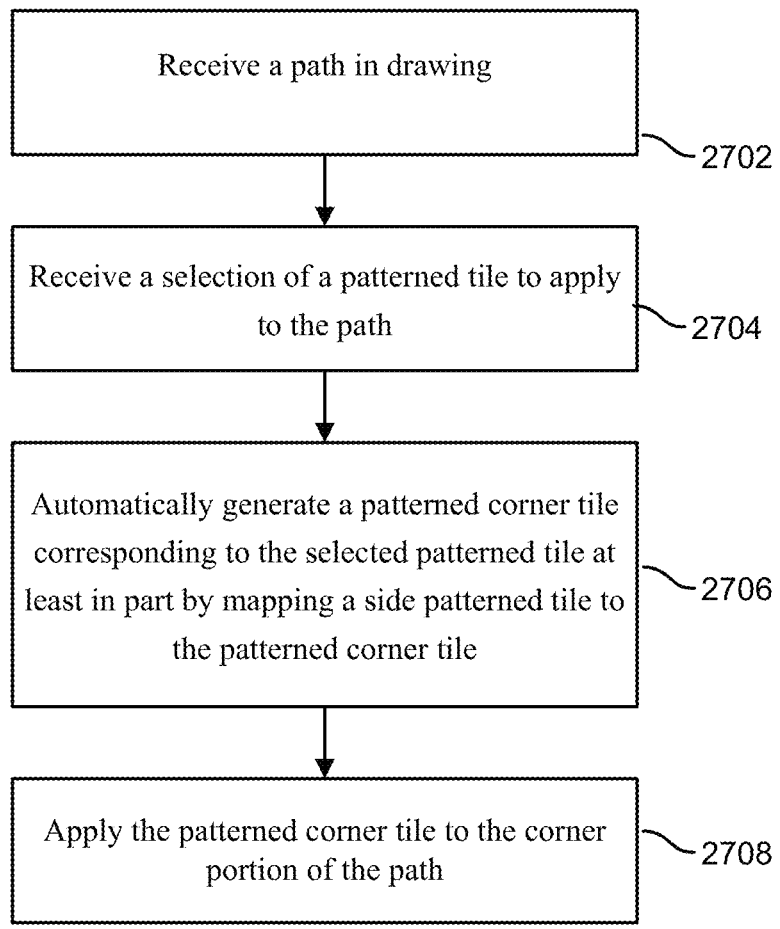
FIG. 27 is a flow chart illustrating an embodiment of automatically generating a corner tile.

FIG. 27 is a flow chart illustrating an embodiment of automatically generating a corner tile. At 2702, a path in an artwork is received. The path has at least one corner. For example, path 2500 is received. At 2704, a selection of a patterned tile to apply to the path is received. For example, a patterned side tile such as patterned tile 2400 is received. At 2706, a patterned corner tile(s) corresponding to the selected patterned side tile is automatically generated at least in part by mapping a patterned side tile to the patterned corner tile. For example, patterned corner tile 2602 is automatically generated by mapping patterned side tile 2400 to patterned corner tile 2602. In various embodiments, this mapping may be performed in various ways, as will be more fully described below. At 2708, the automatically generated patterned corner tile applied to the corner portion of the path. For example, patterned corner tile 2602 is applied to the corner of path 2500 to obtain artwork 2600. In some embodiments, more than one patterned corner tile is generated and applied to the corner portion of the path, an example of which is described below.

Figure 28:
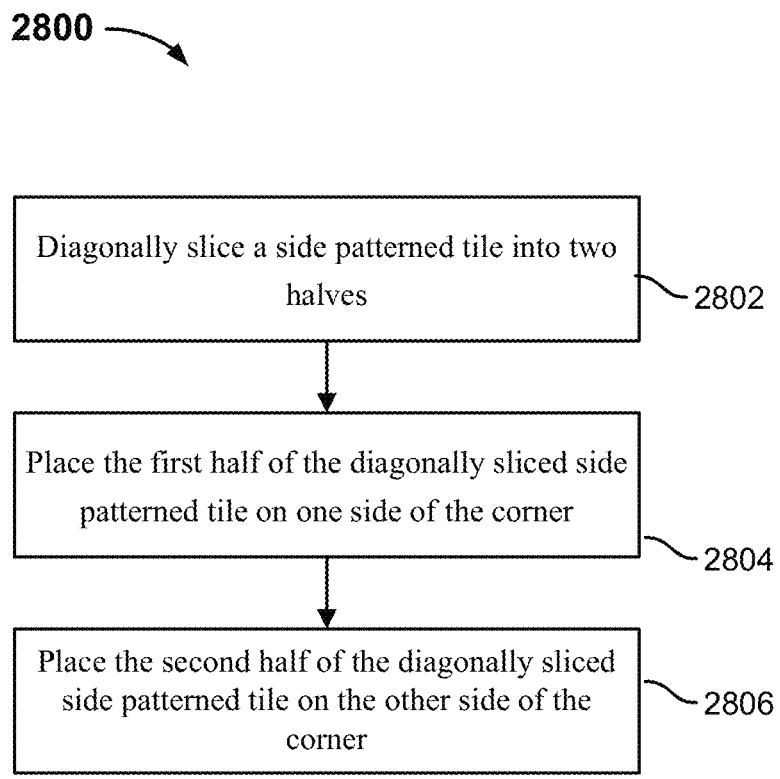
FIG. 28 is a flow chart illustrating an embodiment of automatically mapping a patterned side tile to a patterned corner tile by slicing the side tile diagonally.

FIG. 28 is a flow chart illustrating an embodiment of automatically mapping a patterned side tile to a patterned corner tile by slicing the side tile diagonally. In some embodiments, process 2800 may be used to perform 2706. An example of process 2800 is shown in artwork 2600. In this example, at 2802, a patterned side tile is diagonally sliced into two halves. At 2804, the first half of the diagonally sliced side tile pattern is placed on one side of the corner portion of the path and the second half of the diagonally sliced side tile pattern is placed on the other side of the corner portion of the path.

For example, to generate patterned corner tile 2602, patterned side tile 2400 is divided diagonally. One half is mapped to patterned corner tile half 2604 and the other half is mapped to patterned corner tile half 2606. Stated another way, one half of side tile 2400 becomes half 2604 of corner tile 2602 and the other half of side tile 2400 becomes half 2606 of corner tile 2602. In various embodiments, which half of side tile 2400 is mapped to which half of corner tile 2602 may vary. Also, one or both halves of side tile 2400 may be rotated before becoming half of corner tile 2602.

Figure 29:
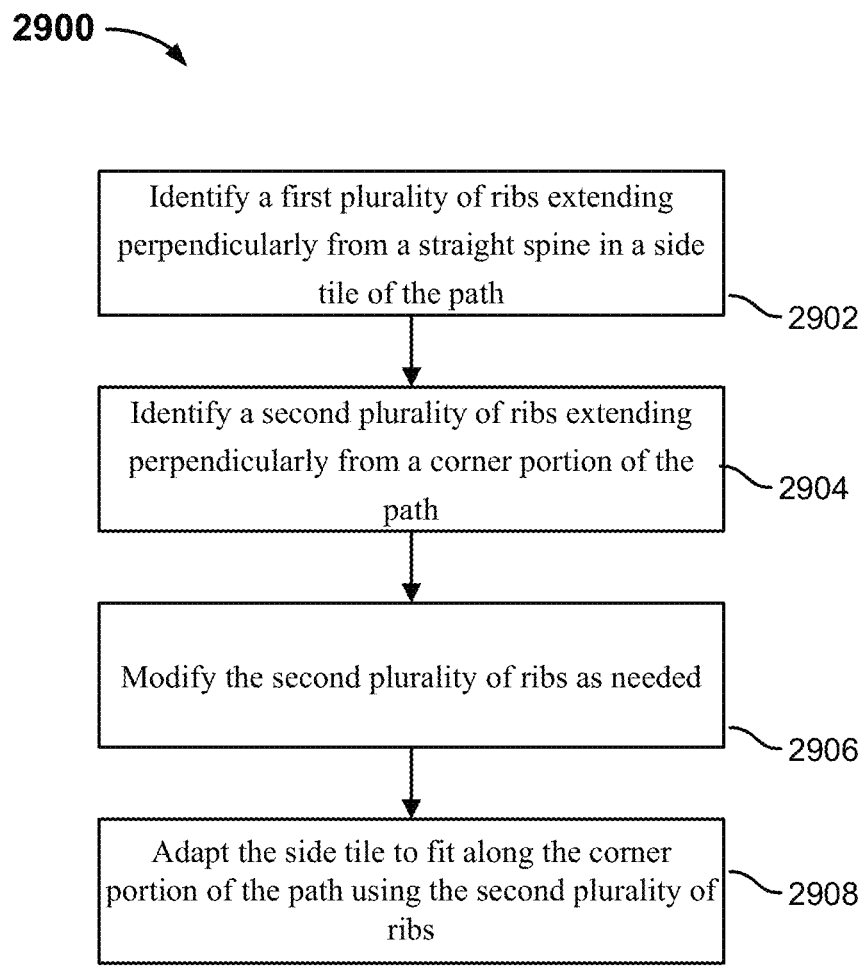
FIG. 29 is a flow chart illustrating an embodiment of automatically mapping a patterned side tile to a patterned corner tile by identifying ribs in the side tile and corner tile(s).

FIG. 29 is a flow chart illustrating an embodiment of automatically mapping a patterned side tile to a patterned corner tile by identifying ribs in the side tile and corner tile(s). In some embodiments, process 2900 may be used to perform 2706. Examples of process 2900 are shown in artworks 3000 and 3100 and will be discussed more fully below. In this example, at 2902, a first plurality of ribs extending perpendicularly from a straight spine in a side tile of the path is identified. In some embodiments, this is performed using step 2102 of FIG. 21 where the source artwork is the side tile. At 2904, a second plurality of ribs extending perpendicularly from a corner portion of the path is identified. In some embodiments, this is performed using step 2104 where the destination path is the corner portion of the path in the artwork. At 2906, the second plurality of ribs is modified as needed. In some embodiments, this is performed using steps 2106-2108 to avoid the side tile folding on itself. At 2908, the side tile is adapted to fit along the corner portion of the path using the second plurality of ribs. In some embodiments, this is performed using step 2110, where the source artwork is the side tile and the destination path is the corner portion of the path in the artwork.

Figure 30:
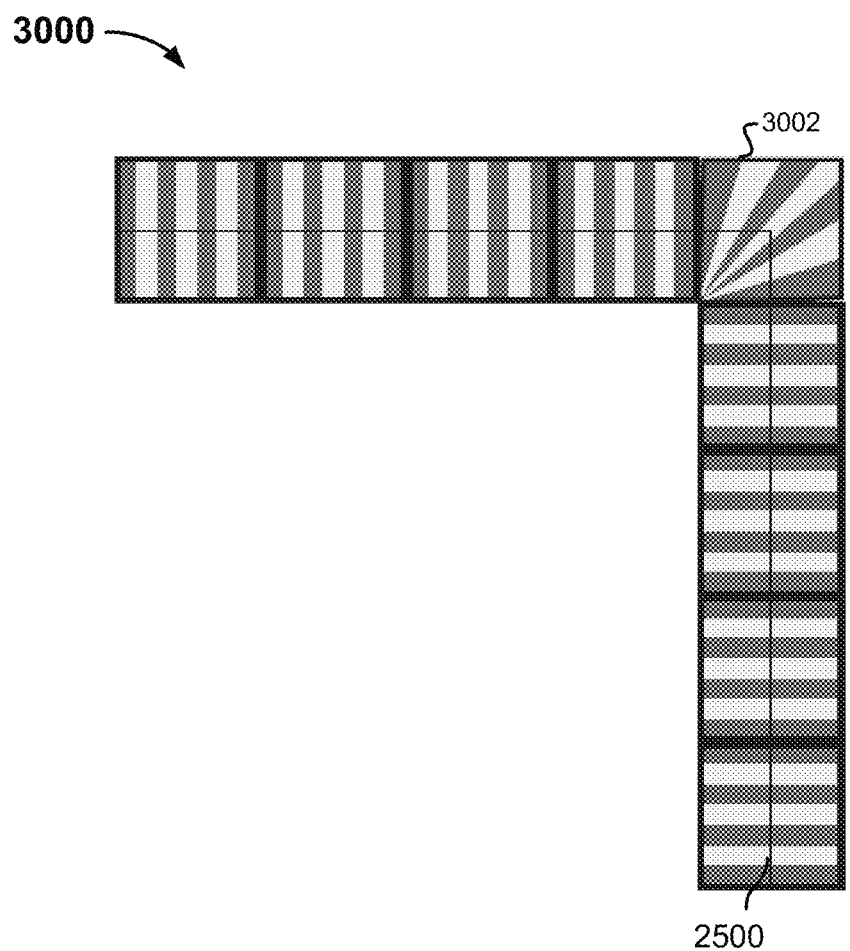
FIG. 30 is a diagram illustrating an example of applying a patterned tile to a path where the corner tile is generated using ribs.

FIG. 30 is a diagram illustrating an example of applying a patterned tile to a path where the corner tile is generated using ribs. Artwork 3000 shows an example of using process 2900 where there is one patterned corner tile. In example artwork 3000, 4 patterned side tiles are applied to the top side of path 2500 and 4 patterned side tiles are applied to the right side of path 2500. The thick black lines indicate the division between tiles. Patterned corner tile 3002 is applied to the corner portion of path 2500.

In some embodiments, patterned corner tile 3002 is generated using process 2900. For example, at step 2902, the first plurality of ribs comprises the ribs in side tile 2400. At 2904, the second plurality of ribs comprises a set of ribs perpendicular to the corner portion of path 2500. Diagram 3004 shows the second plurality of ribs, when the straight path (spine) is bent to form path 2500. In step 2906, because each of the second plurality of ribs crosses another non-adjacent rib, the second plurality of ribs is modified. Diagram 3006 shows the second plurality of ribs after modification, where ribs 2 and 3 map to the same rib. At 2908, tile 2400 is adapted to fit along the corner portion of the path, as shown in diagram 3010. Diagram 3008 shows what the corner tile would look like without folding avoidance (i.e., without adjusting any ribs).

As can be seen in artwork 3000, the automatically generated patterned corner tile looks like a single patterned side tile that "bends" around the corner.

Figure 31:
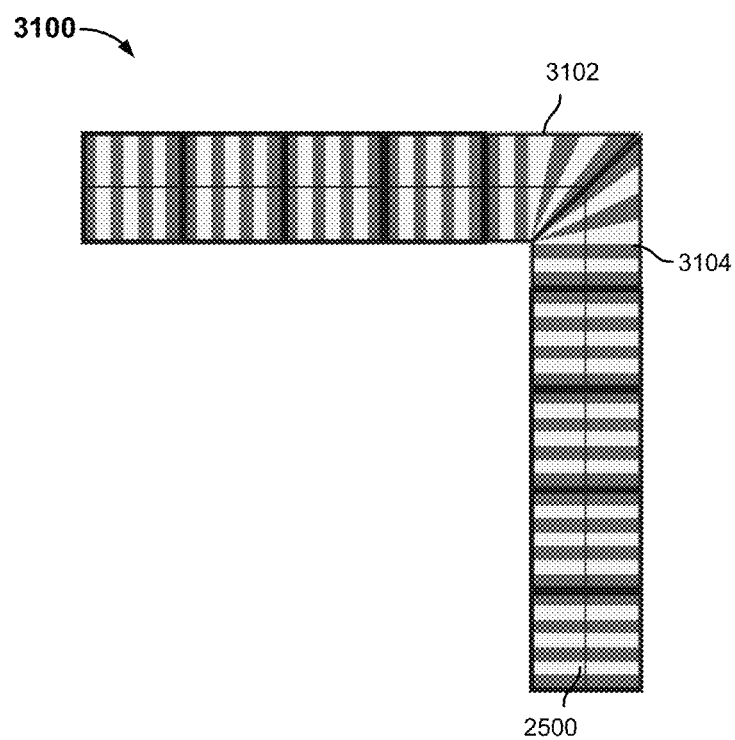
FIG. 31 is a diagram illustrating another example of applying a patterned tile to a path where the corner tile is generated using ribs.

FIG. 31 is a diagram illustrating another example of applying a patterned tile to a path where the corner tile is generated using ribs. Artwork 3100 shows another example of using process 2900, where there are two patterned corner tiles. In example artwork 3100, 4 patterned side tiles are applied to the top side of path 2500 and 4 patterned side tiles are applied to the right side of path 2500. The thick black lines indicate the division between tiles. In this example, there are two patterned corner tiles—corner tile 3102 and 3104 both are applied to the corner portion of path 2500.

In some embodiments, corner tiles 3102 and 3104 are generated using process 2900. For example, at step 2902, the first plurality of ribs comprises the ribs in half of the adjacent side tile and the ribs in the other half of the other adjacent side tile. At 2904, the second plurality of ribs comprises a set of ribs perpendicular to the corner portion of path 2500. Diagram 3104 shows the second plurality of ribs, when the straight path (spine) is bent to form path 2500. In step 2906, because each of the second plurality of ribs crosses another non-adjacent rib, the second plurality of ribs is modified. Diagram 3106 shows the second plurality of ribs after modification, where rips 2 and 3 map to the same rib. At 2908, the two adjacent side tiles are adapted to fit along the corner portion of the path, as shown in diagram 3110. Diagram 3108 shows what the corner tile would look like without folding avoidance (i.e., without adjusting any ribs).

As can be seen in artwork 3100, the automatically generated patterned corner tiles look like they are "stretched out" from the two side tiles adjacent to the corner. (The outer portion of the adjacent side tile is stretched and the inner portion of the adjacent side tile is shrunk.) In this example, the corner of the path is exactly midway between the two adjacent (corner) tiles, and exactly half of each of the adjacent (corner) tiles is stretched in a portion and shrunk in a portion.

Figure 32:
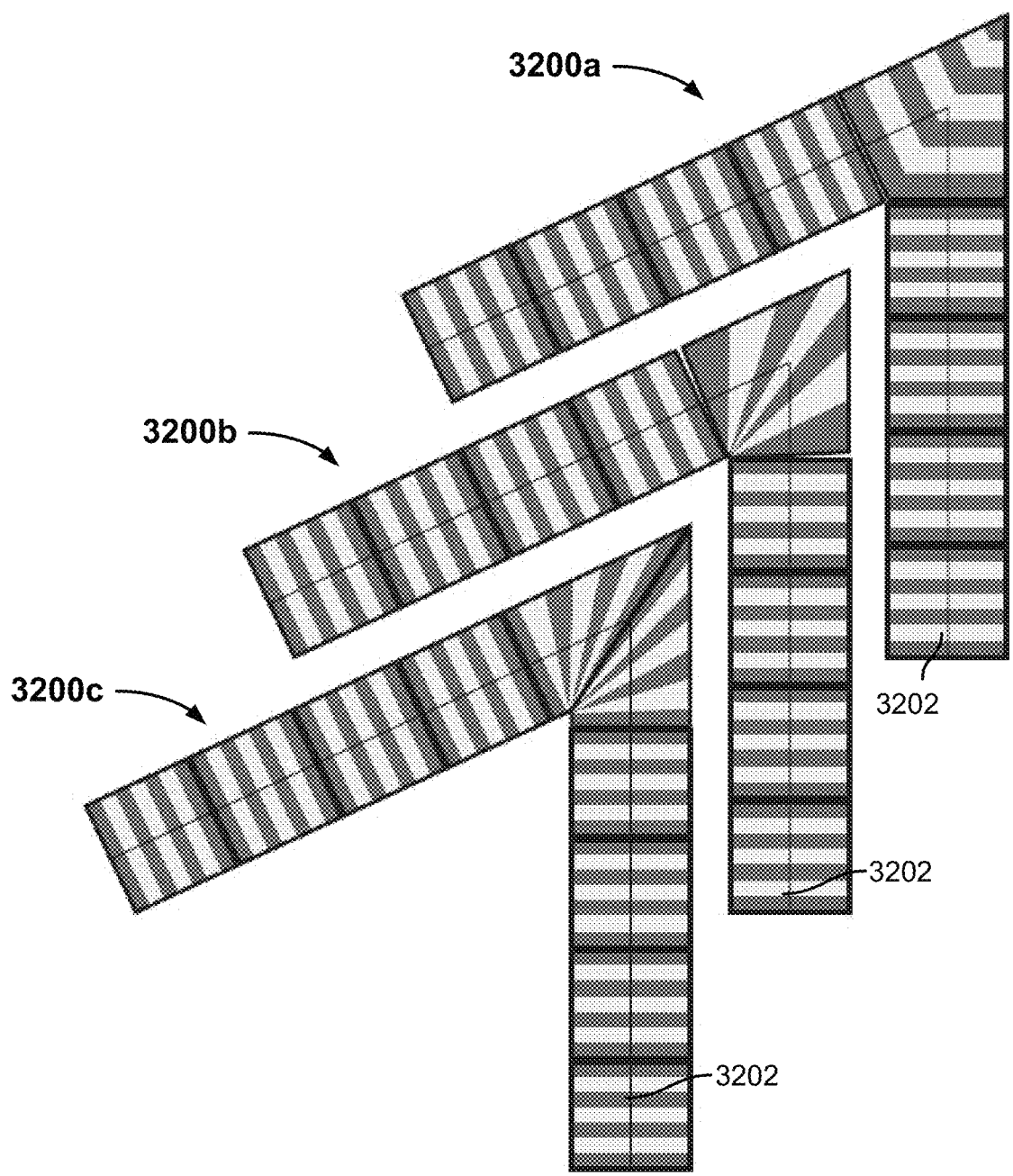
FIG. 32 illustrates examples of automatically generating a patterned corner tile(s) when the path has an acute angle.

FIG. 32 illustrates examples of automatically generating a patterned corner tile(s) when the path has an acute angle. Artworks 3200a, 3200b, and 3200c correspond to process

2800, process 2900 with one corner tile, and process 2900 with two corner tiles, respectively. In example artworks 3200a, 3200b, and 3200c, 4 patterned side tiles are applied to the top side of path 3202 having an acute angle, and 4 patterned side tiles are applied to the right side of path 3202. The thick black lines indicate the division between tiles.

Figure 33:
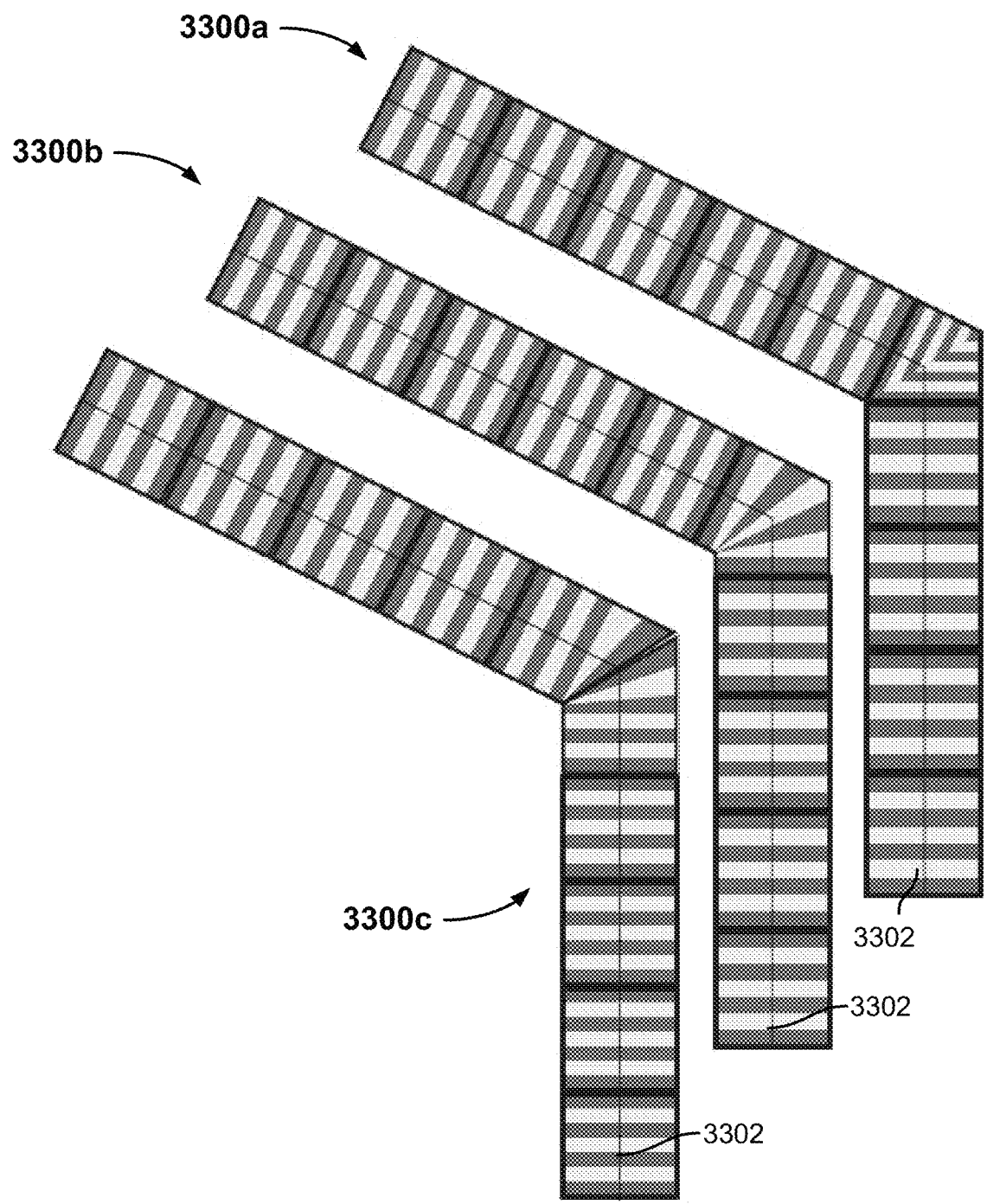
FIG. 33 illustrates examples of automatically generating a patterned corner tile(s) when the path has an obtuse angle.

FIG. 33 illustrates examples of automatically generating a patterned corner tile(s) when the path has an obtuse angle. Artworks 3300a, 3300b, and 3300c correspond to process 2800, process 2900 with one corner tile, and process 2900 with two corner tiles, respectively. In example artworks 3300a, 3300b, and 3300c, 4 patterned side tiles are applied to the top side of path 3302 having an obtuse angle, and 4 patterned side tiles are applied to the right side of path 3302. The thick black lines indicate the division between tiles.

Figure 34:
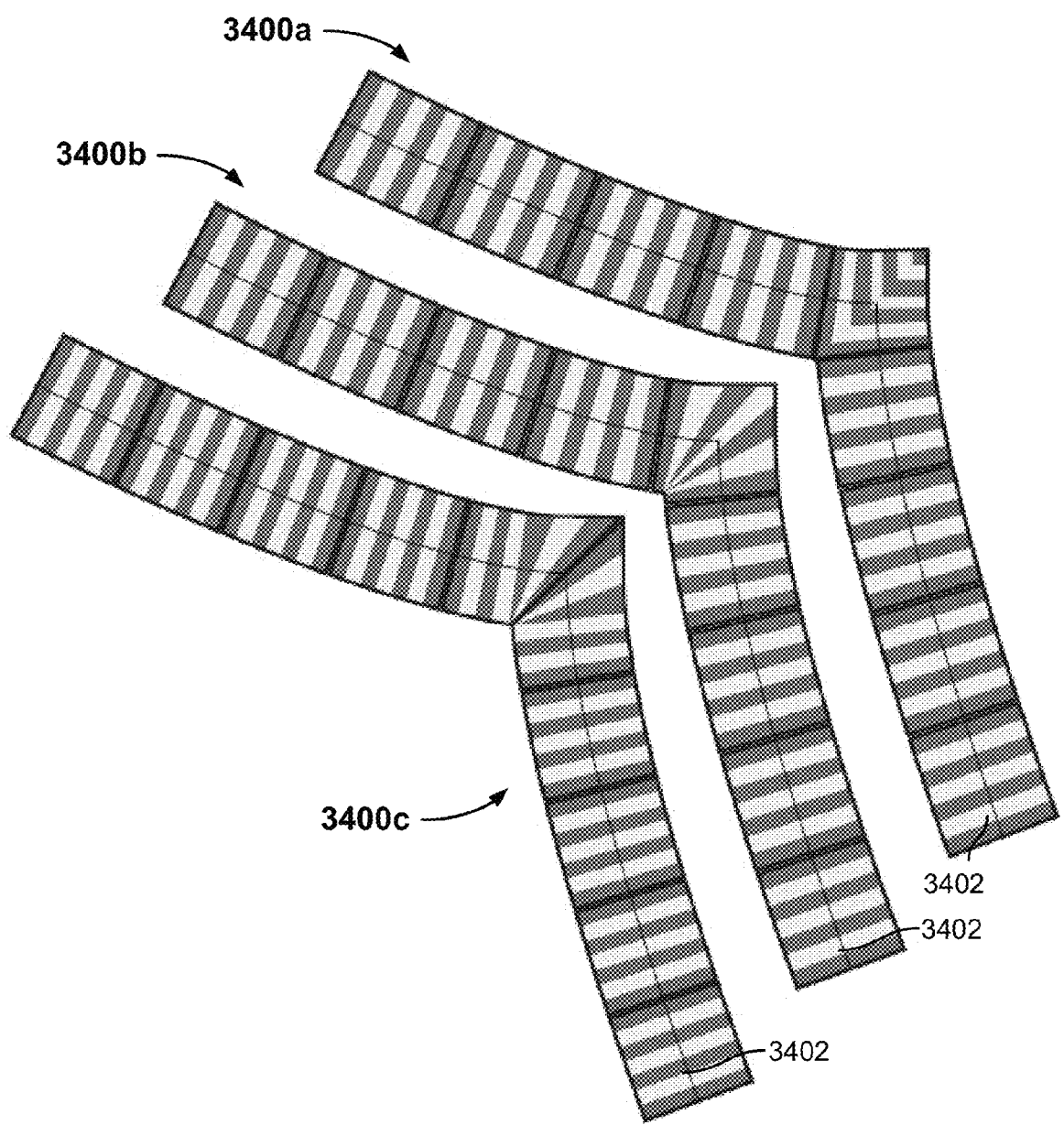
FIG. 34 illustrates examples of automatically generating a patterned corner tile(s) when the path has a curved angle.

FIG. 34 illustrates examples of automatically generating a patterned corner tile(s) when the path has a curved angle. Artworks 3400a, 3400b, and 3400c correspond to process 2800, process 2900 with one corner tile, and process 2900 with two corner tiles, respectively. In example artworks 3400a, 3400b, and 3400c, 4 patterned side tiles are applied to the top side of path 3402 having a curved angle, and 4 patterned side tiles are applied to the right side of path 3402. The thick black lines indicate the division between tiles.

Figure 35:
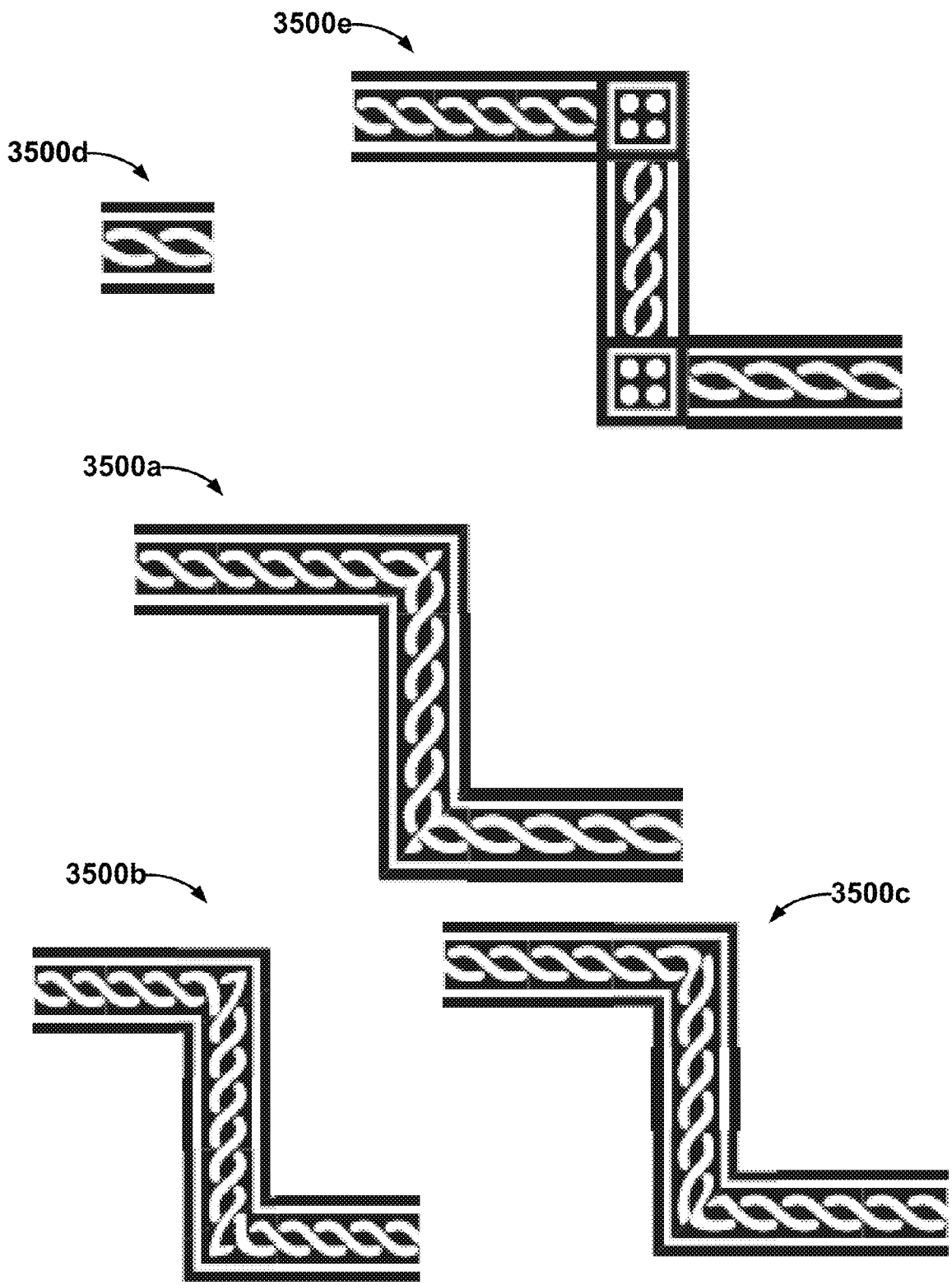
FIG. 35 illustrates examples of automatically generating a patterned corner tile(s) when the path has two right angles and the side tile has a first pattern.

FIG. 35 illustrates examples of automatically generating a patterned corner tile(s) when the path has two right angles and the side tile has a first pattern. Artwork 3500d shows a single patterned side tile. Artwork 3500e shows the single patterned side tile applied to the path using manually designed custom corner tiles. Artworks 3500a, 3500b, and 3500c shows the single patterned side tile applied to the path using automatically generated patterned corner tiles as disclosed herein. Artworks 3500a, 3500b, and 3500c correspond to process 2800, process 2900 with one corner tile, and process 2900 with two corner tiles, respectively. As can be seen in artwork 3500b, the automatically generated patterned corner tile looks like a single patterned side tile that "bends" around the corner. As can be seen in artwork 3500c, the automatically generated patterned corner tiles look like they are "stretched out" from the two side tiles adjacent to the corner. (The outer portion of the adjacent side tile is stretched and the inner portion of the adjacent side tile is shrunk.) In artwork 3500c, the corner is where two tiles meet, whereas in artworks 3500a and 3500b, there is a tile centered around the corner.

Figure 36:
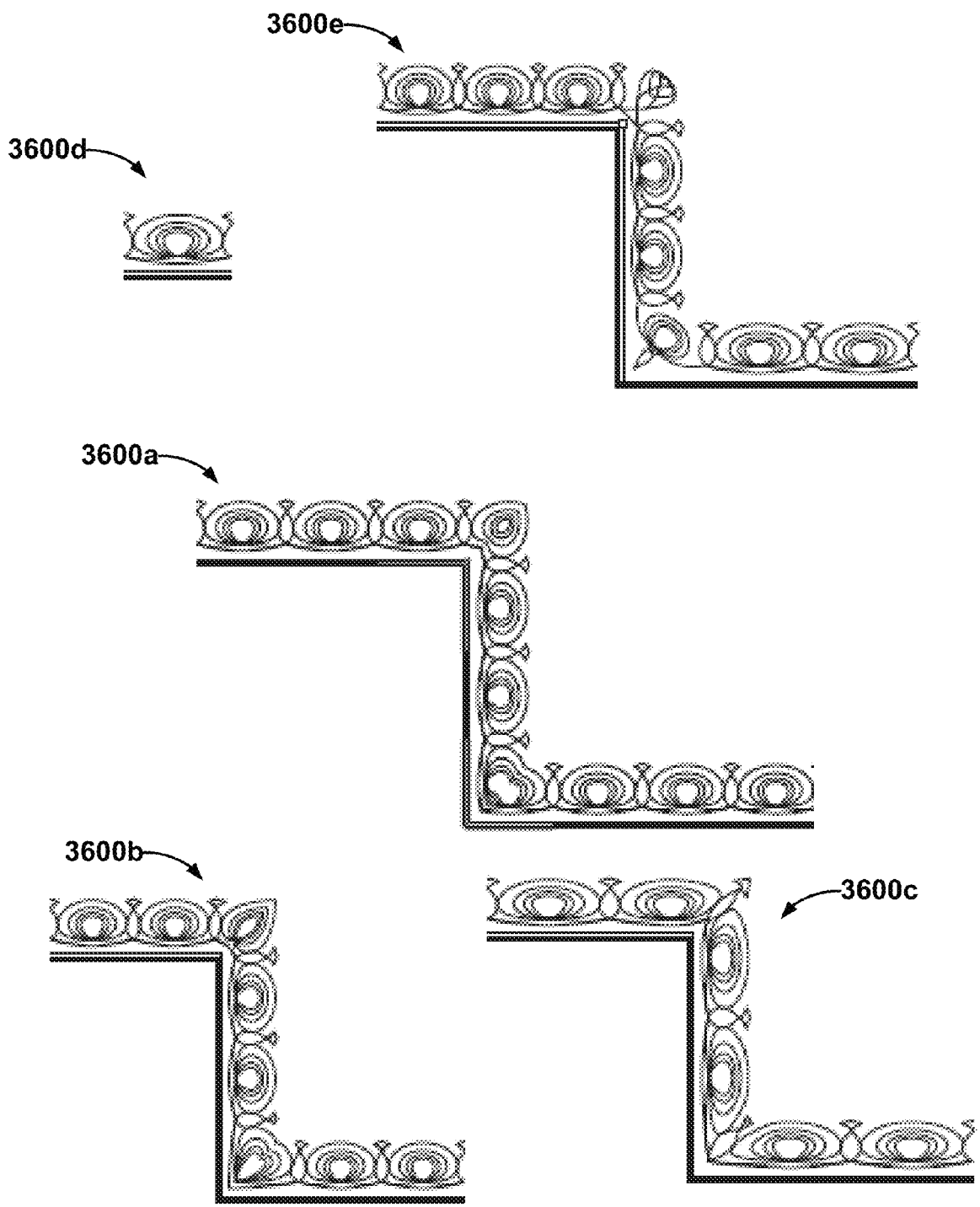
FIG. 36 illustrates examples of automatically generating a patterned corner tile(s) when the path has two right angles and the side tile has a second pattern.

FIG. 36 illustrates examples of automatically generating a patterned corner tile(s) when the path has two right angles and the side tile has a second pattern. Artwork 3600d shows a single patterned side tile. Artwork 3600e shows the single patterned side tile applied to the path using manually designed custom corner tiles. Artworks 3600a, 3600b, and 3600c shows the single patterned side tile applied to the path using automatically generated patterned corner tiles as disclosed herein. Artworks 3600a, 3600b, and 3600c correspond to process 2800, process 2900 with one corner tile, and process 2900 with two corner tiles, respectively. As can be seen in artwork 3600b, the automatically generated patterned corner tile looks like a single patterned side tile that is "bent" around the corner. As can be seen in artwork 3600c, the automatically generated patterned corner tiles look like they are "stretched out" from the two side tiles adjacent to the corner. (The outer portion of the adjacent side tile is stretched and the inner portion of the adjacent side tile is shrunk.) In artwork 3600c, the corner is where two tiles meet, whereas in artworks 3600a and 3600b, there is a tile centered around the corner.

Figure 37:
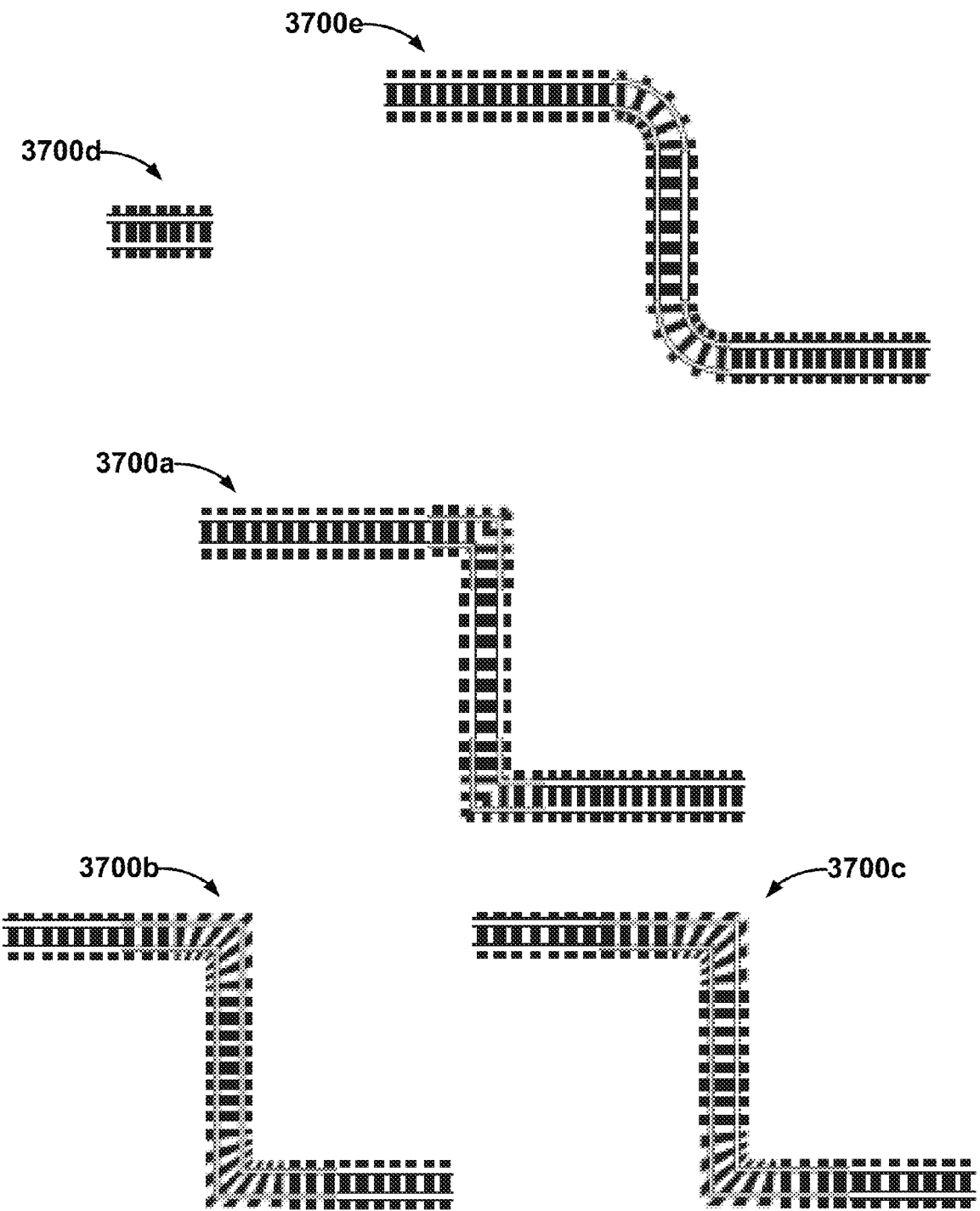
FIG. 37 illustrates examples of automatically generating a patterned corner tile(s) when the path has two right angles and the side tile has a third pattern.

FIG. 37 illustrates examples of automatically generating a patterned corner tile(s) when the path has two right angles and the side tile has a third pattern. Artwork 3700d shows a single patterned side tile. Artwork 3700e shows the single patterned side tile applied to the path using manually designed custom corner tiles. Artworks 3700a, 3700b, and 3700c shows the single patterned side tile applied to the path using automatically generated patterned corner tiles as disclosed herein. Artworks 3700a, 3700b, and 3700c correspond to process 2800, process 2900 with one corner tile, and process 2900 with two corner tiles, respectively. As can be seen in artwork 3700b, the automatically generated patterned corner tile looks like a single patterned side tile that is "bent" around the corner. As can be seen in artwork 3700c, the automatically generated patterned corner tiles look like they are "stretched out" from the two side tiles adjacent to the corner. (The outer portion of the adjacent side tile is stretched and the inner portion of the adjacent side tile is shrunk.) In artwork 3700c, the corner is where two tiles meet, whereas in artworks 3700a and 3700b, there is a tile centered around the corner.

Figure 38:
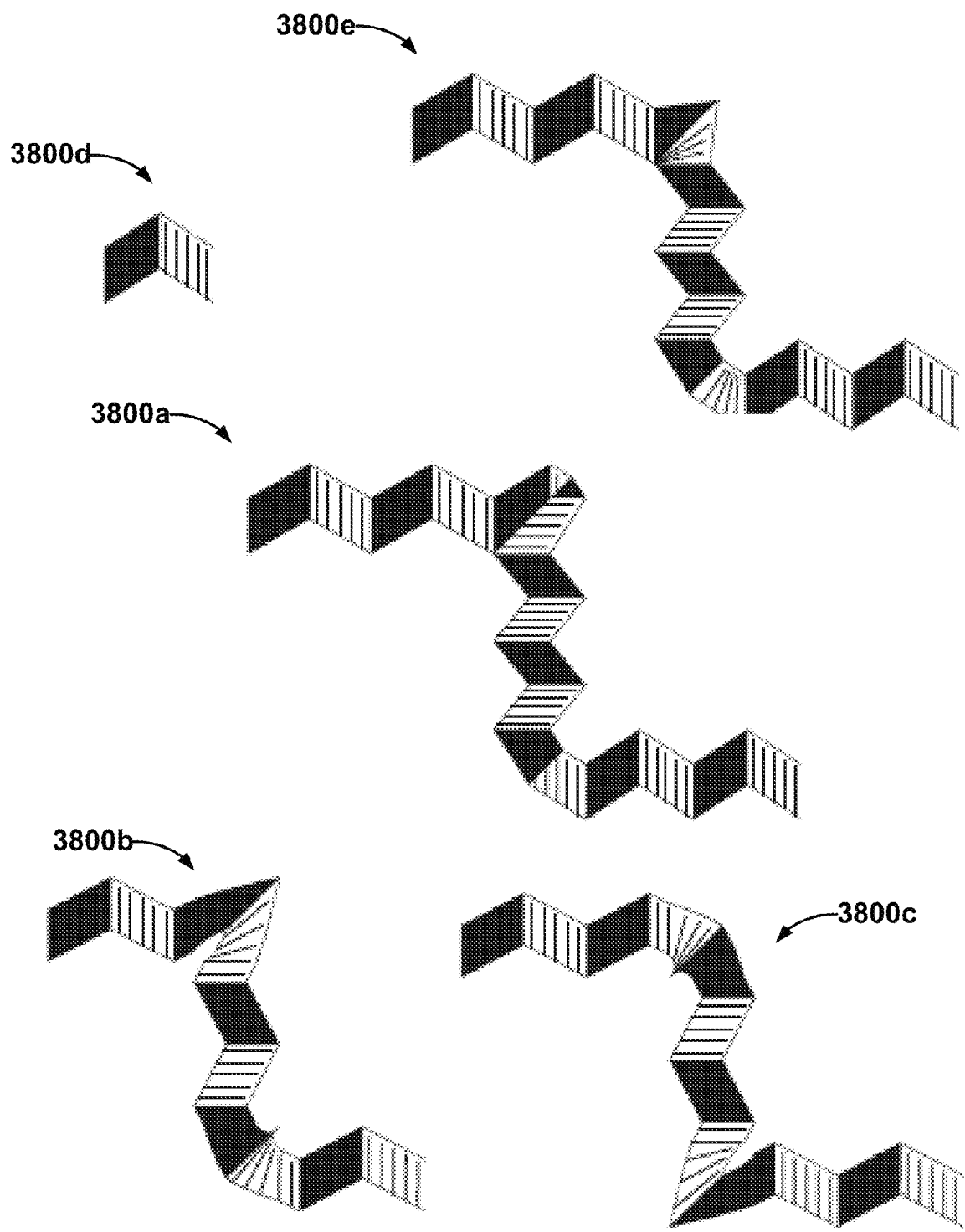
FIG. 38 illustrates examples of automatically generating a patterned corner tile(s) when the path has two right angles and the side tile has a third pattern.

FIG. 38 illustrates examples of automatically generating a patterned corner tile(s) when the path has two right angles and the side tile has a third pattern. Artwork 3800d shows a single patterned side tile. Artwork 3800e shows the single patterned side tile applied to the path using manually designed custom corner tiles. Artworks 3800a, 3800b, and 3800c shows the single patterned side tile applied to the path using automatically generated patterned corner tiles as disclosed herein. Artworks 3800a, 3800b, and 3800c correspond to process 2800, process 2900 with one corner tile, and process 2900 with two corner tiles, respectively. As can be seen in artwork 3800b, the automatically generated patterned corner tile looks like a single patterned side tile that is "bent" around the corner. As can be seen in artwork 3800c, the automatically generated patterned corner tiles look like they are "stretched out" from the two side tiles adjacent to the corner. (The outer portion of the adjacent side tile is stretched and the inner portion of the adjacent side tile is shrunk.) In artwork 3800c, the corner is where two tiles meet, whereas in artworks 3800a and 3800b, there is a tile centered around the corner.

As can be seen in FIG. 35-38, the different techniques used to generate a corner tile yield different results, each of which may have varying desirability to the user. For example, the automatically generated corners of artworks 3700a, 3800a, and 3800c may be aesthetically unappealing to some users. As such, in some embodiments, the user may be presented with corner tiles resulting from more than one technique and be able to preview the different corner tiles alone and/or as applied to a default example path or a path in the user's artwork.

Figure 39:
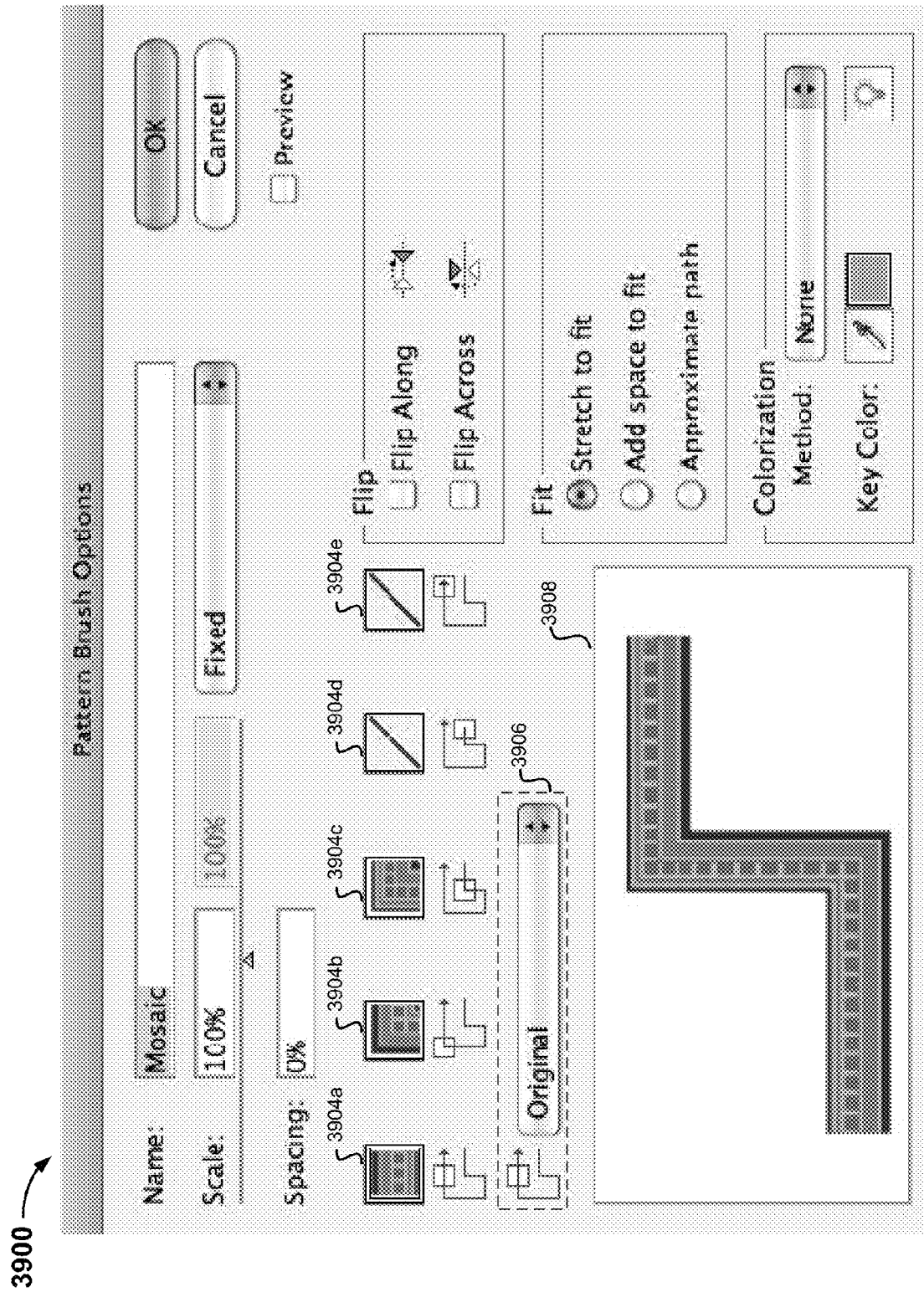
FIG. 39 is an example user interface for previewing and selecting patterned tiles.

FIG. 39 is an example user interface for previewing and selecting patterned tiles. In this example, user interface 3900 allows the user to select various patterned tiles to use for various portions of the path including side tile 3904a, right corner tile 3904b, left corner tile 3904c, start 3904d, and end tile 3904f. As shown, a patterned tile has been selected for side tile 3904a, but not start tile 3904d and end tile 3904f. As currently shown, side tile 3904a is selected (as indicated by the black outline around it). For the selected patterned tile, the user can scroll through various patterned tiles from options list 3906. As currently shown, the "Original" tile is selected for side tile 3904a. The selected pattern (Original) is shown in side tile 3904a. For corner tiles 3904b and 3904c, options list 3906 includes one or more of the automatically generated corner tiles disclosed herein. Start tile 3904d and end tile 3904f are blank because the user has not chosen special tiles for the start and end. Preview window 3908 shows a preview of the current patterned tile selections applied to the path(s) in the artwork. In some embodiments, preview window 3908 updates each time a patterned tile selection changes. "Mosaic" is the name of this particular pattern. "Scale", "Spacing", "Flip", "Fit", and "Colorization" provide various options for the user to modify the pattern and/or indicate how the tiles should be laid out.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a path in an artwork, the path having at least one corner;
receive a selection of a patterned tile to apply to the path; and
automatically generate a patterned corner tile corresponding to the selected patterned tile at least in part by mapping a side patterned tile to a corner patterned tile, wherein said mapping comprises:
identifying a first plurality of ribs extending perpendicularly from a straight spine in a side tile of the path;
identifying a second plurality of ribs extending perpendicularly from a corner portion of the path, wherein the first and second pluralities of ribs are used to map the patterned tile to the path and are separate from the appearance of the artwork; and
modifying the second plurality of ribs at least in part by determining a contiguous region along the path including a subset of ribs, wherein each of the subset of ribs in the contiguous region crosses another rib in the contiguous region;
and
a memory coupled to the processor and configured to provide the processor with instructions.

2. The system of claim 1, wherein the processor is configured to modify the second plurality of ribs at least in part by determining a retrograde path.

3. The system of claim 1, wherein the processor is configured to modify the second plurality of ribs at least in part by adjusting each of the subset of ribs in the contiguous region so that each of the ribs no longer crosses another rib in the contiguous region to provide a modified subset of ribs.

4. The system of claim 1, wherein mapping includes bending a side patterned tile around a corner portion of the path.

5. The system of claim 1, wherein mapping includes identifying the side tile adjacent to a corner on each side, and for each of the adjacent side tiles, stretching or shrinking the side patterned tile to go all the way to the corner.

6. The system of claim 5, wherein the corner is exactly midway between the adjacent side tiles.

7. The system of claim 5, wherein exactly half of each of the adjacent side tiles is stretched in a portion and shrunk in a portion.

8. The system of claim 1, wherein a corner is an angled portion of the path, where an angle is defined as a discontinuity along a derivative of the path and is not necessarily 90 degrees.

9. The system of claim 1, wherein the processor is further configured to determine whether there is a predefined patterned corner tile corresponding to the selected patterned tile.

10. The system of claim 9, wherein the patterned corner tile is automatically generated in the event that there is no predefined patterned corner tile.

11. The system of claim 9, wherein the processor is further configured to use the predefined patterned corner tile in the event that there is a predefined patterned corner tile.

12. The system of claim 1, wherein the patterned corner tile is a left patterned corner tile or a right patterned corner tile.

13. The system of claim 1, wherein there are more than two patterned corner tiles generated for a corner portion.

14. The system of claim 1, wherein the processor is further configured to provide a user interface for presenting a plurality of automatically generated patterned corner tiles from which to select.

15. A computer program product, the computer program product being embodied in a non-transitory computer readable storage medium and comprising computer instructions for:
receiving a path in an artwork, the path having at least one corner;
receiving a selection of a patterned tile to apply to the path; and
automatically generating a patterned corner tile corresponding to the selected patterned tile at least in part by mapping a side patterned tile to a corner patterned tile, wherein said mapping comprises:
identifying a first plurality of ribs extending perpendicularly from a straight spine in a side tile of the path;
identifying a second plurality of ribs extending perpendicularly from a corner portion of the path, wherein the first and second pluralities of ribs are used to map the patterned tile to the path and are separate from the appearance of the artwork; and
modifying the second plurality of ribs at least in part by determining a contiguous region along the path including a subset of ribs, wherein each of the subset of ribs in the contiguous region crosses another rib in the contiguous region.

16. A method, comprising:
receiving at a processor a path in an artwork, the path having at least one corner;
receiving a selection of a patterned tile to apply to the path; and
automatically generating a patterned corner tile corresponding to the selected patterned tile at least in part by mapping a side patterned tile to a corner patterned tile, wherein said mapping comprises:
identifying a first plurality of ribs extending perpendicularly from a straight spine in a side tile of the path;
identifying a second plurality of ribs extending perpendicularly from a corner portion of the path, wherein the first and second pluralities of ribs are used to map the patterned tile to the path and are separate from the appearance of the artwork; and
modifying the second plurality of ribs at least in part by determining a contiguous region along the path including a subset of ribs, wherein each of the subset of ribs in the contiguous region crosses another rib in the contiguous region.

17. The method of claim 16, wherein said modifying the second plurality of ribs further comprises adjusting each of the subset of ribs in the contiguous region so that each of the ribs no longer crosses another rib in the contiguous region to provide a modified subset of ribs.

18. The method of claim 16, wherein said modifying the second plurality of ribs is based at least in part upon determining a retrograde path.

19. The method of claim 16, wherein said modifying the second plurality of ribs is based at least in part upon adjusting each of the subset of ribs in the contiguous region so that each of the ribs no longer crosses another rib in the contiguous region to provide a modified subset of ribs.

20. The method of claim 16, wherein said mapping further comprises bending a side patterned tile around a corner portion of the path.

\* \* \* \* \*